United States Patent
Yoneyama

(10) Patent No.: US 6,301,404 B1
(45) Date of Patent: Oct. 9, 2001

(54) SUPERVISORY SIGNAL OPTICAL BYPASS CIRCUIT, OPTICAL AMPLIFYING REPEATER AND SUPERVISORY SYSTEM

(75) Inventor: Kenichi Yoneyama, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/271,291

(22) Filed: Mar. 17, 1999

(30) Foreign Application Priority Data

Mar. 17, 1998 (JP) ................................................. 10-066622
Jul. 10, 1998 (JP) ................................................. 10-196033

(51) Int. Cl.[7] ...................................................... G02B 6/28
(52) U.S. Cl. ........................... 385/24; 359/110; 359/118; 359/127; 359/179; 385/27
(58) Field of Search .................................. 385/15, 24, 27, 385/31, 37, 39, 42, 47, 48; 359/109, 110, 115, 118, 119, 123, 124, 127, 130, 135, 161, 173, 174, 177, 179

(56) References Cited

U.S. PATENT DOCUMENTS

| | | | |
|---|---|---|---|
| 4,211,920 | * | 7/1980 | Wakabayashi ........................ 359/177 |
| 4,564,933 | * | 1/1986 | Hirst ..................................... 714/713 |
| 5,315,674 | * | 5/1994 | Asako ................................... 385/15 |
| 5,825,515 | * | 10/1998 | Anderson ............................. 359/110 |
| 6,014,481 | * | 1/2000 | Kremers ............................... 385/24 |

FOREIGN PATENT DOCUMENTS

| | | |
|---|---|---|
| 2 268 017 A | 12/1993 | (GB) . |
| 64-32731 | 2/1989 | (JP) . |
| 03 042 927 A | 2/1991 | (JP) . |
| 4-97629 | 3/1992 | (JP) . |
| 6-204949 | 7/1994 | (JP) . |
| H06-204949 | 7/1994 | (JP) . |
| 8-181656 | 7/1996 | (JP) . |
| H08-181656 | 7/1996 | (JP) . |
| 09 018 411 | 1/1997 | (JP) . |
| H9-18411 | 1/1997 | (JP) . |
| 9-191291 | 7/1997 | (JP) . |
| H10-51401 | 2/1998 | (JP) . |
| WO 97/23965 | 7/1997 | (WO) . |

* cited by examiner

*Primary Examiner*—John D. Lee
(74) *Attorney, Agent, or Firm*—Sughrue, Mion, Zinn, Macpeak & Seas, PLLC

(57) ABSTRACT

A supervisory signal light bypass circuit which has: a first 2×2 optical coupler provided on a first optical transmission line; a second 2×2 optical coupler provided on a second optical transmission line through which signal light flows in the direction opposite to the first optical transmission line; a third optical transmission line that connects to one output port of the first optical coupler and one output port of the second optical coupler: a first reflecting member that is provided at another output port of the first optical coupler and has a first reflection wavelength; and a second reflecting member that is provided at another output port of the second optical coupler and has a second reflection wavelength.

30 Claims, 20 Drawing Sheets

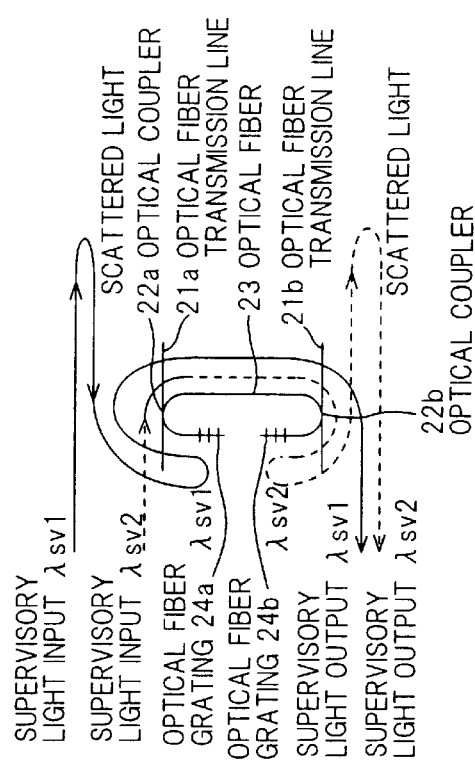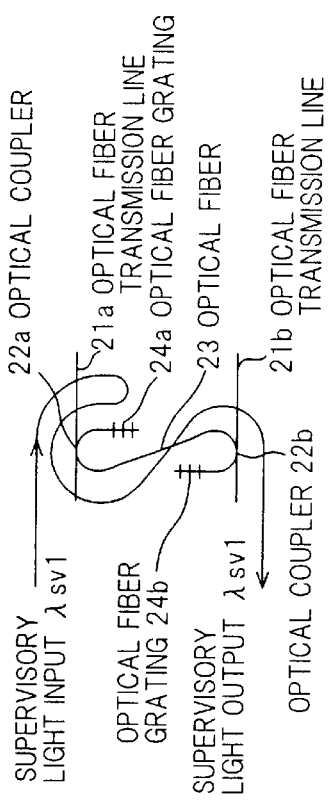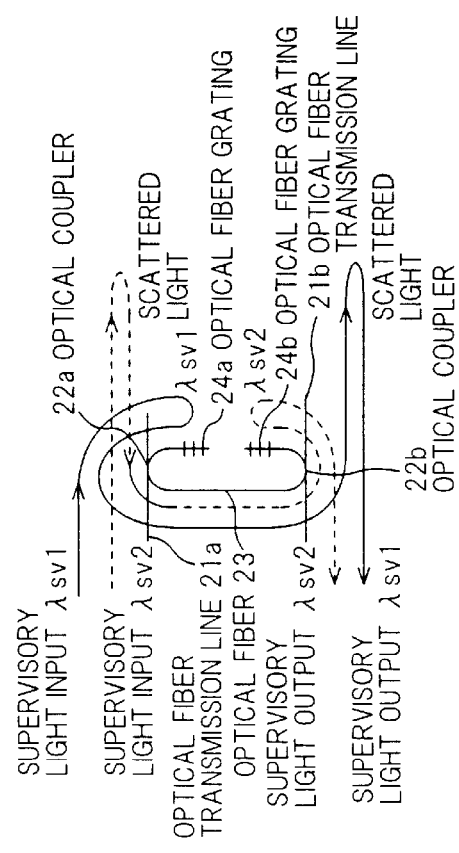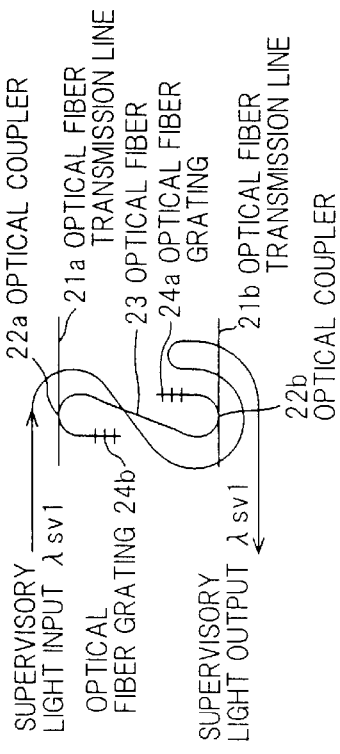

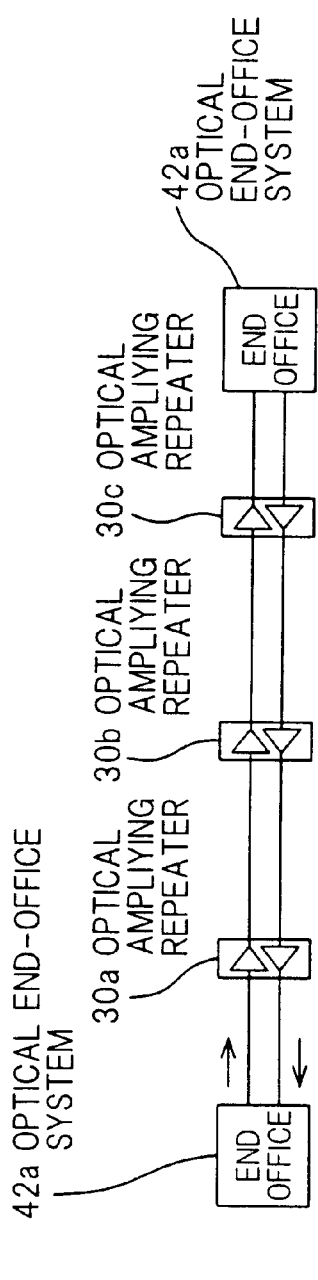
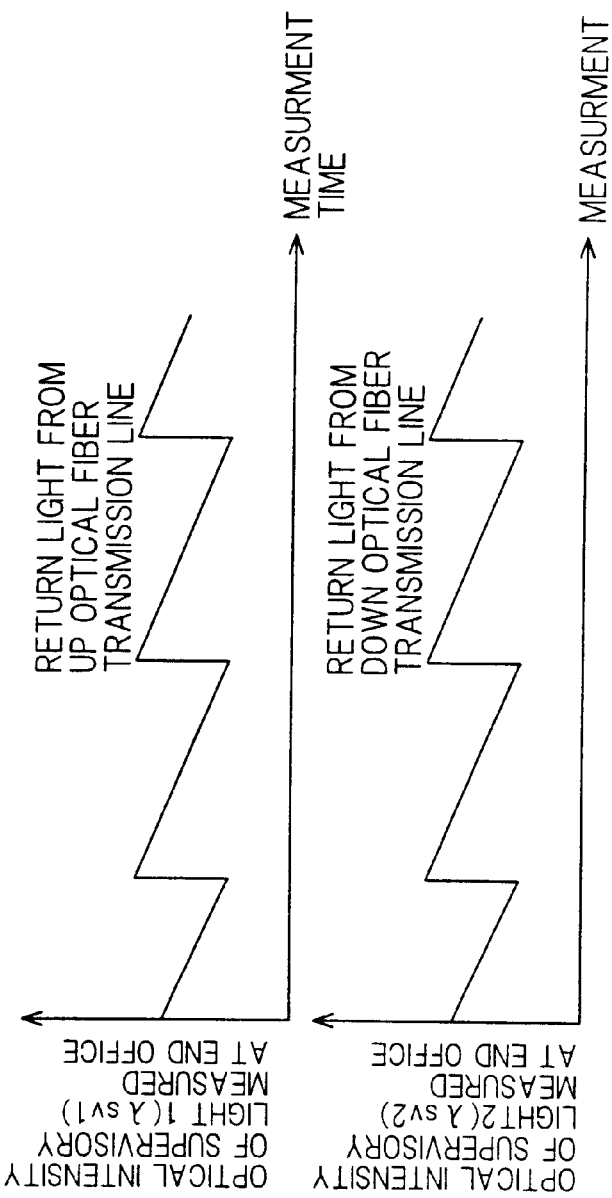
FIG. 11A
FIG. 11B
FIG. 11C

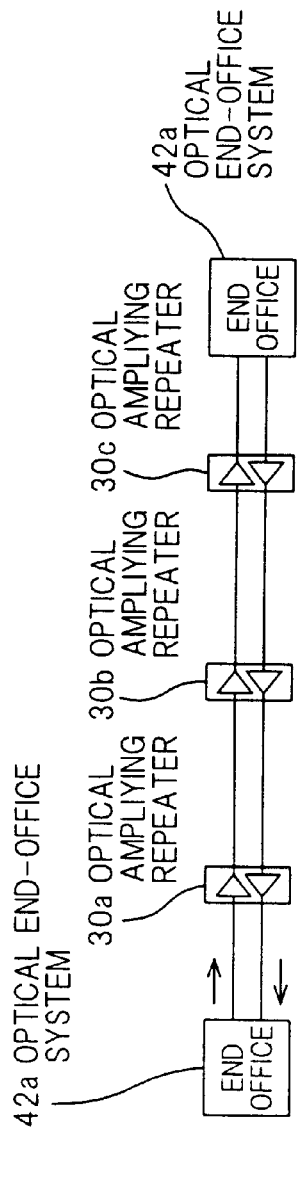
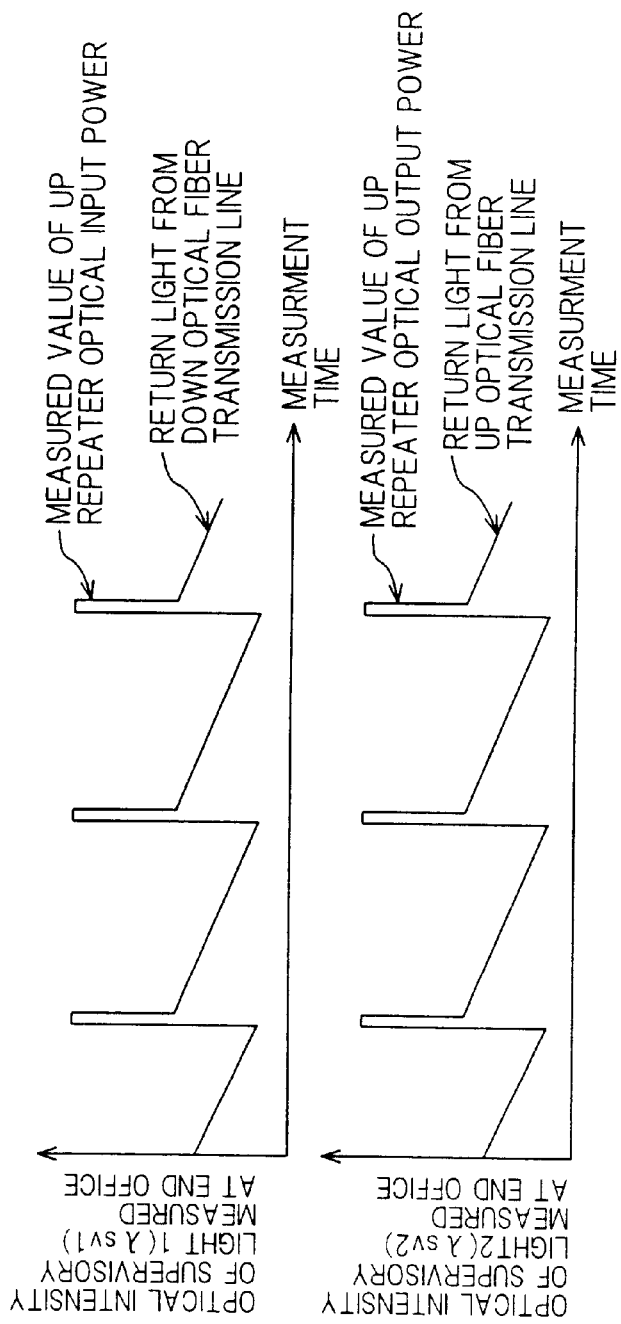
FIG. 15A
FIG. 15B
FIG. 15C

SUPERVISORY SIGNAL OPTICAL BYPASS CIRCUIT, OPTICAL AMPLIFYING REPEATER AND SUPERVISORY SYSTEM

FIELD OF THE INVENTION

This invention relates to a supervisory signal optical bypass circuit for sending back supervisory signal light transmitted from an end-office system to the same system, an optical amplifying repeater, a supervisory system for monitoring an optical repeating/transmitting system.

BACKGROUND OF THE INVENTION

In optical transmission system, in order to guarantee the precise propagation of signal light, it is necessary to supervise its optical amplifying repeater as well as transmission line through supervisory-signal light. Conventional optical amplifying repeaters capable of being supervised through supervisory signal light are explained below.

FIG. 1 shows a first example of conventional optical amplifying repeaters, which is disclosed in Japanese patent application laid-open No. 6-204949 (1994), capable of being supervised through supervisory signal light from an end-office system. FIG. 2 shows the transfer operation of supervisory signal light in the optical amplifying repeater in FIG. 1.

In the optical amplifying repeater 1, an optical amplifier 2a and a 2×2 optical coupler 3a, which means a two-Input and two-output optical coupler, are disposed from the input side to the output side of an up optical fiber transmission line 9a. Also, an optical amplifier 2b and a 2×2 optical coupler 3b are disposed from the input side to the output side of an up optical fiber transmission line 9b. Furthermore, up and down optical attenuators 4a, 4b are disposed, in a loop form, between the optical couplers 3a and 3b.

With this composition, a case that main signal light with four wavelengths ($\lambda_1$ to $\lambda_4$) multiplexed and supervisory signal light with another wavelength ($\lambda_{sv}$) as shown by the spectra of signal light in FIG. 2, where the vertical axis indicates optical intensity and the horizontal axis indicates optical wavelength, are transmitted from an end-office system (not shown) to the up optical fiber transmission line 9a is explained below.

The main signal light and supervisory signal light are amplified by the optical amplifier 2a, and then divided by the optical coupler 3a. Then, the divided main signal light $\lambda_1$ to $\lambda_4$ and supervisory signal light $\lambda_{sv}$ are attenuated by the attenuator 4a, coupled with signal light transmitted through the down optical fiber transmission line 9b by the optical coupler 3b, then returning to the end-office system that transmitted the main signal light $\lambda_1$ to $\lambda_4$ and supervisory signal light $\lambda_{sv}$. Therefore, the transmission line supervising system of the end-office system can monitor the optical amplifying repeater 1.

FIG. 3 shows a second example of conventional optical amplifying repeaters, which is disclosed in Japanese patent application laid-open No.8-181656 (1996), capable of being supervised through supervisory signal light from an end-office system. FIG. 4 shows the transfer operation of supervisory signal light in the optical amplifying repeater in FIG. 3.

In the optical amplifying repeater 11, an optical amplifier 12a and a 2×2 optical coupler 13a are disposed from the input side to the output side of an up optical fiber transmission line 19a. Also, an optical amplifier 12b and a 2×2 optical coupler 13b are disposed from the input side to the output side of an up optical fiber transmission line 19b. Furthermore, up and down optical bandpass filters 4a, 4b are disposed, in a loop form, between the optical couplers 3a and 3b.

With this composition, a case that main signal light with four wavelengths ($\lambda_1$ to $\lambda_4$) multiplexed and supervisory signal light with another wavelength ($\lambda_{sv}$) as shown by the spectra of signal light in FIG. 4, where the vertical axis indicates optical intensity and the horizontal axis indicates optical wavelength, are transmitted from an end-office system (notshown) to the up optical fiber transmission line 19a is explained below.

The main signal light and supervisory signal light are amplified by the optical amplifier 12a, and then divided by the optical coupler 13a. Then, of the divided main signal light $\lambda_1$ to $\lambda_4$ and supervisory signal light $\lambda_{sv}$, only the supervisory signal light $\lambda_{sv}$ transmitted at a permittivity shown in FIG. 4 by the optical bandpass filter 14a, coupled with signal light transmitted through the down optical fiber transmission line 19b by the optical coupler 13b, then returning to the end-office system that transmitted the main signal light $\lambda_1$ to $\lambda_4$ and supervisory signal light $\lambda_{sv}$. Therefore, the transmission line supervising system of the end-office system can monitor the optical amplifying repeater 11.

However, in the first conventional optical amplifying repeater shown in FIG. 1, since the main signal light has to be transferred to the opposite line with the supervisory signal light, there is a problem that the main signal light of the opposite line deteriorates and reduces in its level due to the interference between the main signal light to be transferred and another main signal light to be transmitted through the opposite line, and due to the mixing of the main signal light transferred. Also, when the loss of the return path is set to be large so as to avoid such deterioration of main signal light, the level of supervisory signal light to return reduces. In this case, a high-precision receiving circuit is required for the transmission line supervising system.

On the other hand, in the second conventional optical amplifying repeater shown in FIG. 3, though the supervisory signal light is transferred to the opposite line while being extracted by the optical filter, since it is difficult to narrow the pass band of the optical filter, the main signal light adjacent thereto can leak from the optical filter and is transferred to the opposite line. Therefore, there occurs a problem that the main signal light of the opposite line deteriorates and reduces in its level due to the interference between the main signal light to be transferred and another main signal light to be transmitted through the opposite line, and due to the mixing of the main signal light transferred. Also, when the wavelength of supervisory signal light is located apart from that of main signal light so as to avoid such deterioration of main signal light, the amplifying wavelength band of the optical amplifier needs to be widened.

SUMMARY OF THE INVENTION

Accordingly, it is an object of the invention to provide a supervisory signal light bypass circuit, an optical amplifying repeater, a supervisory system and a supervisory method that are capable of transferring supervisory signal light without affecting main signal light propagating through an optical fiber transmission line.

According to the invention, a supervisory signal light bypass circuit, comprises:

a first 2×2 optical coupler provided on a first optical transmission line;

a second 2×2 optical coupler provided on a second optical transmission line through which signal light flows in the direction opposite to the first optical transmission line;

a third optical transmission line that connects to one output port of the first optical coupler and one output port of the second optical coupler;

a first reflecting means that is provided at another output port of the first optical coupler and has a first reflection wavelength; and a second reflecting means that is provided at another output port of the second optical coupler and has a second reflection wavelength.

According to another aspect of the invention, an optical amplifying repeater, comprises:

a first supervisory signal light bypass circuit: that comprises a first 2×2 optical coupler provided on a first optical transmission line, a second 2×2 optical coupler provided on a second optical transmission line through which signal light flows in the direction opposite to the first optical transmission line, a first reflecting means that is provided at one output port of the first optical coupler and has a first reflection wavelength and is provided with a non-reflective end, and a second reflecting means that is provided at one output port of the second optical coupler and has a second reflection wavelength and is provided with a non-reflective end;

a second supervisory signal light bypass circuit that comprises a third 2×2 optical coupler provided on the first optical transmission line, a fourth 2×2 optical coupler provided on the second optical transmission line, a third reflecting means that is provided at one output port of the third optical coupler and has the first reflection wavelength and is provided with a non-reflective end, and a fourth reflecting means that is provided at one output port of the fourth optical coupler and has the second reflection wavelength and is provided with a non-reflective end;

first and second optical amplifiers that are provided inserted into the first and second optical transmission lines, respectively, between the first supervisory signal light bypass circuit and the second supervisory signal light bypass circuit;

a first connecting means for connecting between one output port of the first optical coupler and one output port of the second or fourth optical coupler; and a second connecting means for connecting between one output port of the third optical coupler and one output port of the fourth or second optical coupler.

According to another aspect of the invention, provided is a supervisory system for an optical repeating transmission system that is composed of an optical end-office system to transmit/receive signal light, a first optical transmission line connecting to the optical end-office system, a second optical transmission line that signal light is transmitted in the direction opposite to the first optical transmission line, and at least one optical amplifying repeater with a pair of optical amplifiers for amplifying signal light to transmit through the first and second optical transmission lines, the optical amplifying repeater being disposed on the first and second optical transmission lines, wherein:

the optical end-office system comprises an optical sender to output main signal light, an optical receiver to receive signal light from the second optical transmission line, a transmission line supervising circuit to transmit/receive supervisory signal light, an optical multiplexing means for multiplexing the main signal light and the supervisory signal light and sending them to the first optical transmission line, and an optical demultiplexilng means for demultiplexing the main signal light and supervisory signal light received from the second optical transmission line;

the optical amplifying repeater comprises a supervisory signal light bypass circuit to bypass part of the supervisory signal light from the first optical transmission line to the second optical transmission line; and the transmission line supervising circuit of the optical end-office system receives the supervisory signal light sent back from the second optical transmission line through the supervisory signal light bypass circuit of the optical amplifying repeater, and monitors the first and second optical transmission lines based on the information of intensity amplitude, phase, frequency or time difference between the supervisory signal light transmitted from the optical end-office system and the supervisory signal light received.

According to another aspect of the invention, an optical amplifying repeater for receiving supervisory signal light transmitted through a first transmission line from an end-office system and sending back the supervisory signal light through an opposite second transmission line, comprises:

means for amplifying main signal light and supervisory signal light transmitted through the first transmission line from the end-office system;

means for dividing part of the main signal light and supervisory signal light amplified by the amplifying means;

means for attenuating the main signal light and supervisory signal light divided by the dividing means;

means for transmitting and diffusing only the main signal light attenuated by the attenuated by the attenuating means and for reflecting only the supervisory signal light; and means for coupling the supervisory signal light reflected by the reflecting means to the second transmission line opposite to the first transmission line and sending back the supervisory signal light to the end-office system.

According to another aspect of the invention, an optical amplifying repeater for receiving supervisory signal light transmitted through a first transmission line from an end-office system and sending back the supervisory signal light through a second transmission line opposite to the first transmission line, comprises:

first and second amplifying means for amplifying main signal light and supervisory signal light transmitted through the first and second transmission lines from the end-office system;

first and second dividing/coupling means for dividing/coupling signal light, the first and second dividing/coupling means being the first and second transmission lines;

first and second signal light lines connecting between the first and second dividing/coupling means; and transmitting and reflecting means for transmitting the main signal light and for reflecting the supervisory signal light, the transmitting and reflecting means being provided on the first signal light line.

According to another aspect of the invention, a supervisory method for transmitting supervisory signal light from an end-office system through a first transmission line to an optical amplifying repeater and for monitoring the optical amplifying repeater based on the supervisory signal light sent back to the end office system through a second transmission line opposite to the first transmission line, comprises the steps of:

multiplexing supervisory signal light modulated by any one of optical intensity modulation, optical frequency modulation and optical phase modulation with main signal light transmitted to the first transmission line;

transmitting the supervisory signal light and main signal light multiplexed to the optical amplifying repeater through the first transmission line;

extracting only the supervisory signal light by the optical amplifying repeater and multiplexing the supervisory signal light with main signal light propagating through the second transmission line;

demultiplexing the supervisory signal light and main signal light transmitted through the second transmission line; and monitoring the optical amplifying repeater based on the information of intensity amplitude, phase, frequency or time difference of the supervisory signal light divided.

BRIEF DESCRIPTION OF THE DRAWINGS

The invention will be explained in more detail in conjunction with the appended drawings, wherein:

FIGS. 6A to 6D are illustrations showing the path of supervisory signal light in the supervisory signal light bypass circuits in FIGS. 5A to 5D.

FIG. 11A is a connection diagram showing the flow supervisory signal light through the optical amplifying repeaters in the first embodiment, FIGS. 11B and 11C are waveform diagrams showing the monitoring result of optical fiber transmission system when using the paths shown in FIGS. 9 and 10.

FIG. 15A is a connection diagram showing the flow supervisory signal light through the optical amplifying repeaters in the second embodiment, FIGS. 15B and 15C are waveform diagrams showing the monitoring result of optical fiber transmission system when using the paths shown in FIGS. 13 and 14.

DESCRIPTION OF THE PREFERRED EMBODIMENTS

Figure 1:
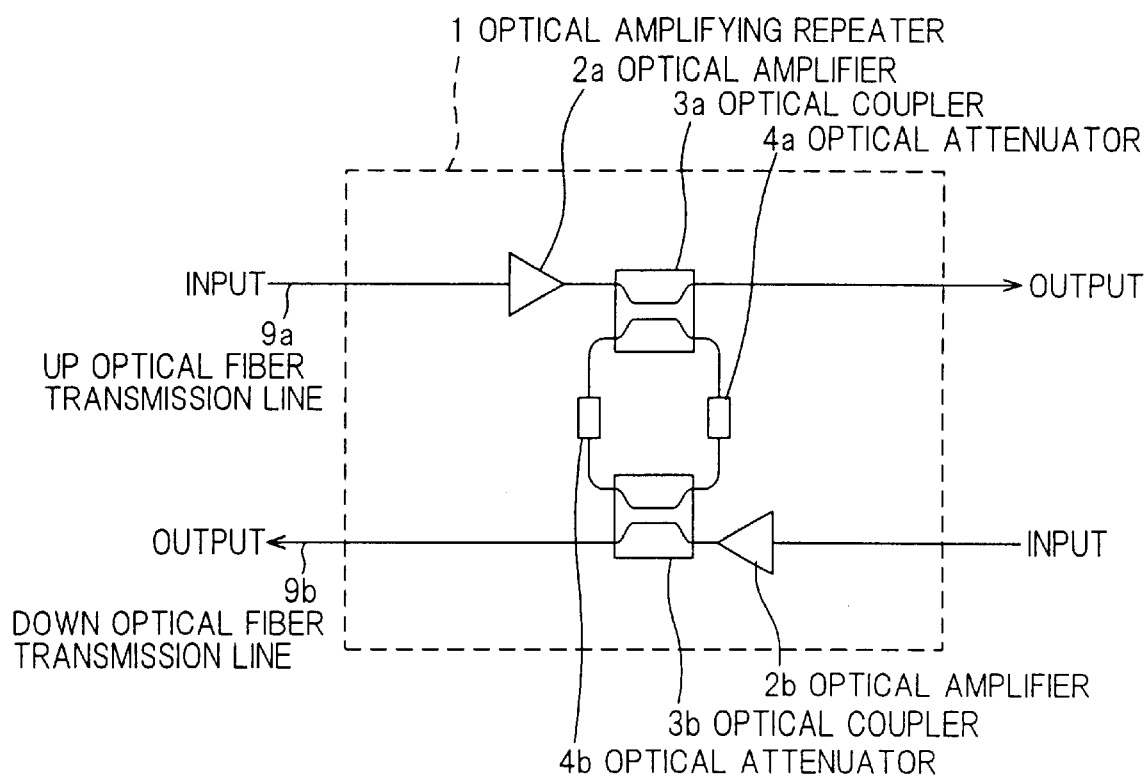
FIG. 1 is a connection diagram showing the conventional optical amplifying repeater capable of being monitored using supervisory signal light from an end-office system.
Figure 2:
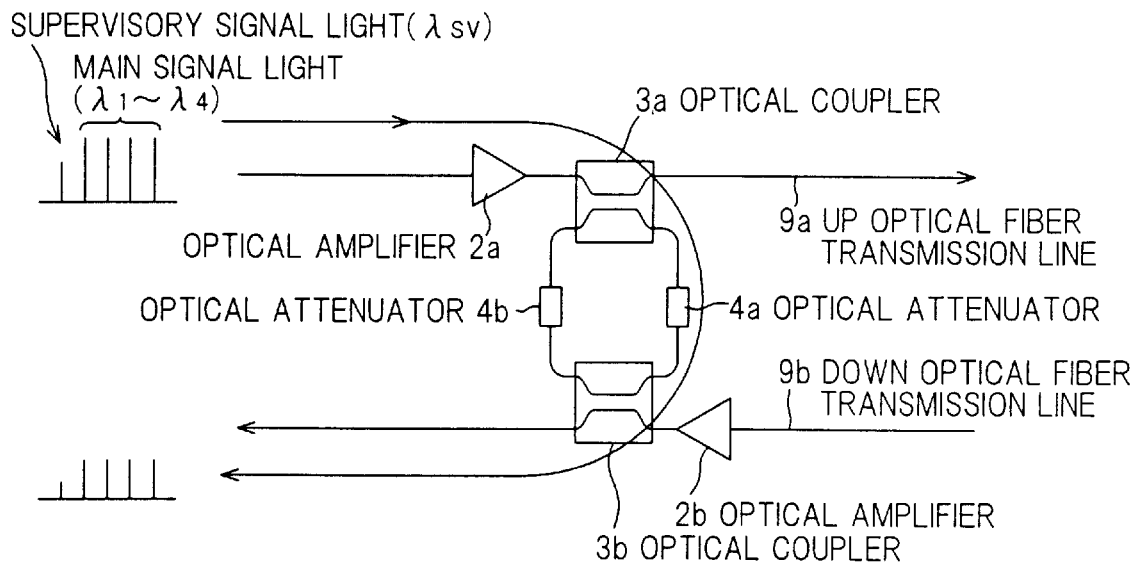
FIG. 2 is an illustration showing the path of supervisory signal light in the optical amplifying repeater in FIG. 1.
Figure 3:
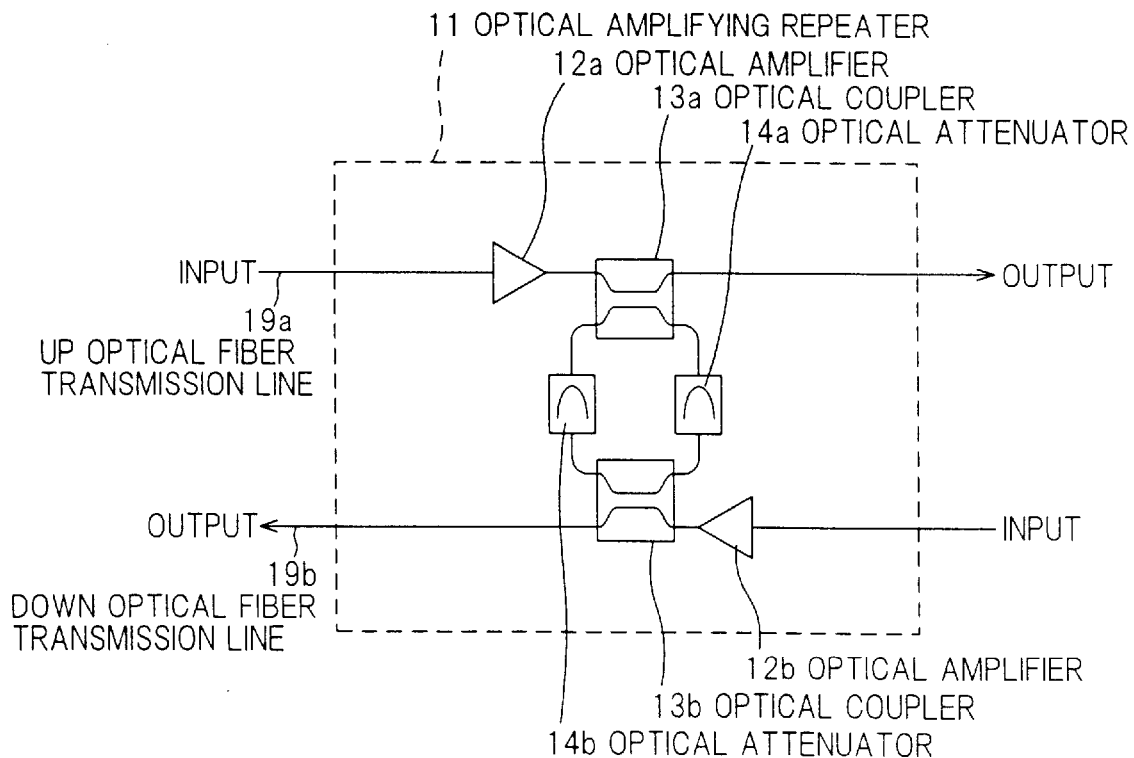
FIG. 3 is a connection diagram showing the other conventional optical amplifying repeater capable of being monitored using supervisory signal light from an end-office system.
Figure 4:
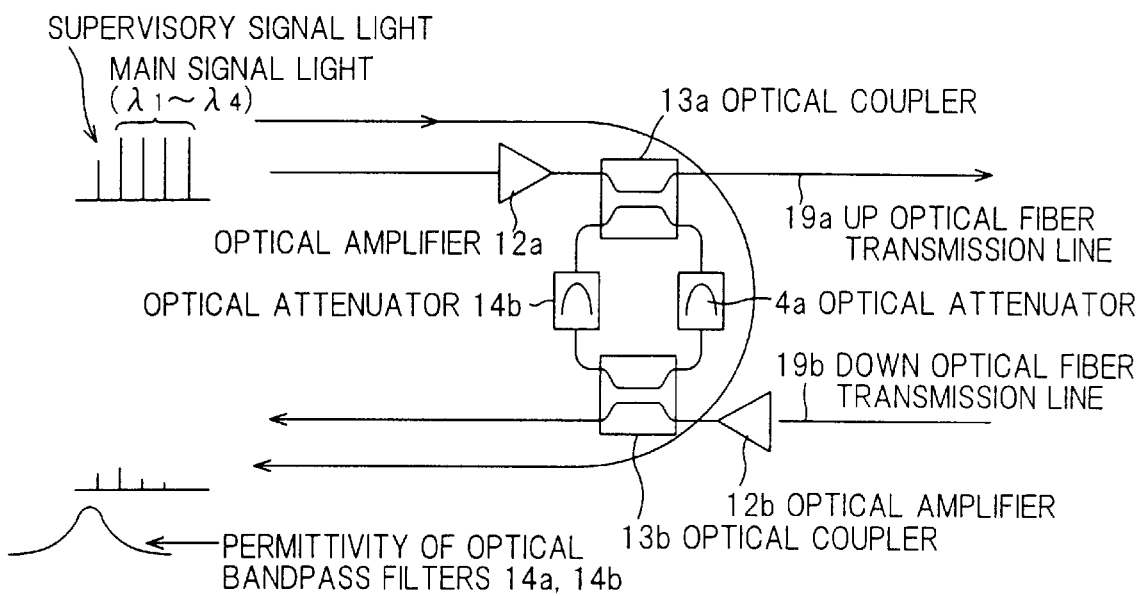
FIG. 4 is an illustration showing the path of supervisory signal light in the optical amplifying repeater in FIG. 3, FIGS. 5A to 5D are connection diagrams showing examples of supervisory signal light bypass circuit according to the invention.

The preferred embodiments of the invention will be explained below, referring to the drawings.

Figure 5B:
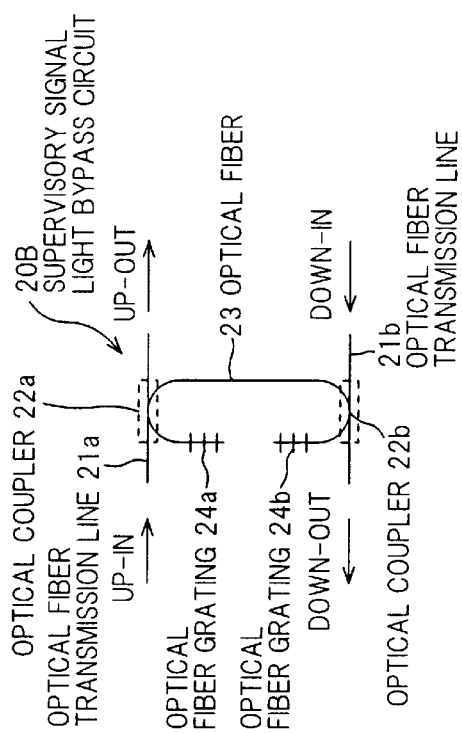
Figure 5D:
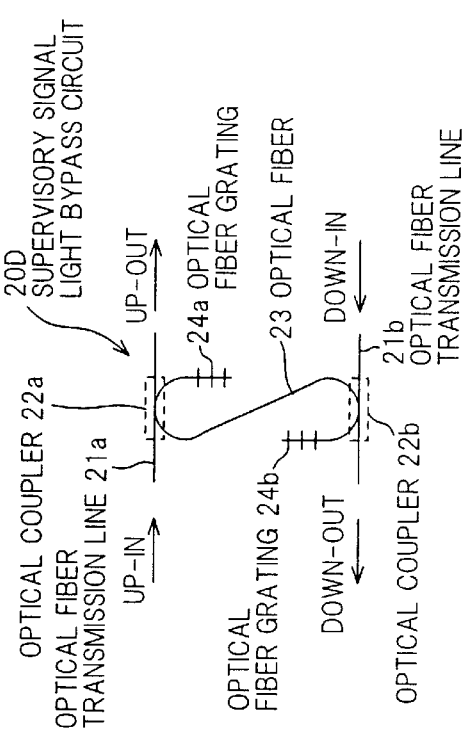
Figure 5A:
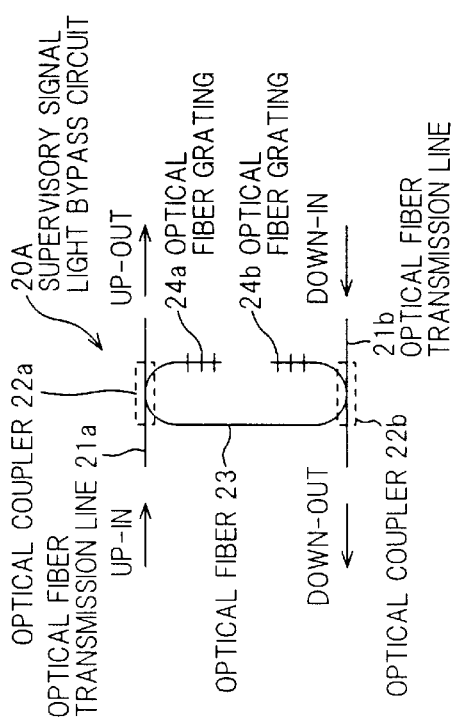
Figure 5C:
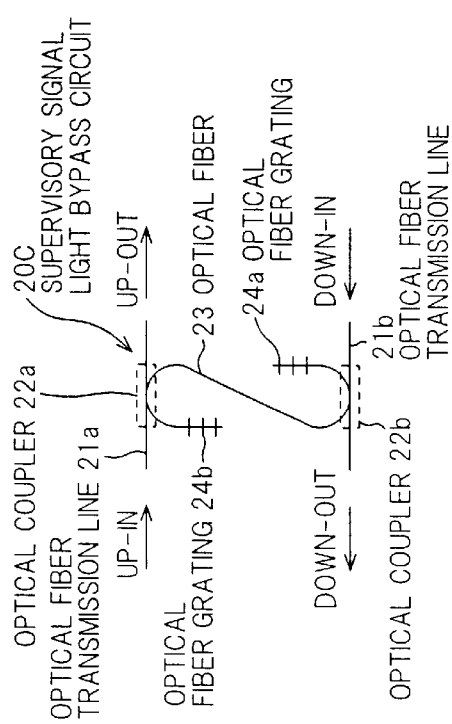

FIGS. 5A to 5D show examples of supervisory signal light bypass circuit according to the invention. In FIGS. 5A to 5D, four forms of supervisory signal light bypass circuits are shown. The supervisory signal light bypass circuits each are composed of two 2×2 optical couplers and two optical fiber gratings. In FIGS. 5A to 5D, 'UP' indicates an up line and 'DOWN' indicates a down line. Also, 'IN' indicates inputting and 'OUT' indicates outputting. FIG. 5A shows a circuit that the back scattered light of supervisory signal light input $\lambda_{sv2}$ from an up optical fiber transmission line 21a can be bypassed. FIG. 5B shows a circuit that the back scattered light from an up optical fiber transmission line 21b can be bypassed, and FIGS. 5C and 5D shows circuits that only supervisory signal light $\lambda_{sv1}$ to be transmitted from an optical end-office system can be bypassed. Here, supervisory signal light is modulated by any means of optical pulse modulation, optical intensity modulation, optical frequency modulation and optical phase modulation.

The supervisory signal light bypass circuit 20A in FIG. 5A is provided with an optical coupler 22a on the up optical fiber transmission line 21a and an optical coupler 22b on the down optical fiber transmission line 21b. Between the input side end of the optical coupler 22a and the output side end of the optical coupler 22b, an optical fiber 23 as the third optical transmission line is connected. An optical fiber grating 24a is connected to the output side end of the optical coupler 22a, and an optical fiber grating 24b is connected to the input side end of the optical coupler 22b. Here, the reflection wavelength of the optical fiber grating 24a is set to correspond to supervisory signal light $\lambda_{sv1}$, and the reflection wavelength of the optical fiber grating 24b is set to correspond to supervisory signal light $\lambda_{sv2}$. Thus, the optical fiber gratings 24a, 24b cannot reflect signal light with a wavelength except the preset wavelengths.

A supervisory signal light bypass circuit 20B in FIG. 5B has a composition that the optical fiber 23 and optical fiber gratings 24a, 24b in FIG. 5A are disposed reversely each other. Also in this composition, the reflection wavelength of the optical fiber grating 24a is set to correspond to supervisory signal light $\lambda_{sv1}$, and the reflection wavelength of the optical fiber grating 24b is set to correspond to supervisory signal light $\lambda_{sv2}$.

A supervisory signal light bypass circuit 20C in FIG. 5C has a composition that, though the up and down optical fiber transmission lines 21a, 21b and optical couplers 22a, 22b are disposed in like manner, the optical fiber grating 24a is connected to the input side end of the optical coupler 22b, the optical fiber grating 24b is connected to the input side end of the optical coupler 22a, and the optical fiber 23 is connected between the output side ends of the optical couplers 22a, 22b.

A supervisory signal light bypass circuit 20D in FIG. 5D has a composition that the optical fiber 23 and optical fiber gratings 24a, 24b in FIG. 5C are disposed reversely each other.

FIGS. 6A to 6D show the paths of supervisory signal light in the supervisory signal light bypass circuits 20A to 20D each composed as shown in FIGS. 5A to 5D. For the supervisory signal light bypass circuit 20A in FIG. 5A, when main signal light $\lambda_1$ to $\lambda_4$ and supervisory signal light $\lambda_{sv1}$ are transmitted from an end-office system (not shown) to the up optical fiber transmission line 21a, the supervisory signal light $\lambda_{sv1}$ is divided by the optical coupler 22a, supplied to the optical fiber grating 24a and reflected thereby, supplied to the down optical fiber transmission line 21b through the optical fiber 23, transmitted through the down optical fiber transmission line 21b to the input side of the optical fiber transmission line 21b. Back scattered light to generate when the supervisory signal light $\lambda_{sv1}$ propagates through the optical fiber transmission line 21b returns to the end-office system that transmitted the supervisory signal light $\lambda_{sv1}$.

Also, the back scattered light of supervisory signal light $\lambda_{sv2}$ transmitted from the end-office system (to generate when the supervisory signal light propagates through the optical fiber transmission line) passes through the optical coupler 22a, scattered in the up optical fiber transmission line 21a and going backward, divided by the optical coupler 22a, supplied to the optical fiber grating 24b through the optical fiber 23 and reflected thereby, transmitted through the down optical fiber transmission line 21b, returning to the end-office system that transmitted the supervisory signal light $\lambda_{sv2}$. Thus, the transmission line supervising system of the end-office system can monitor the optical bypass circuit. Moreover, it does not affect the main signal light to propagate through the optical fiber transmission line.

For the supervisory signal light bypass circuit 20B in FIG. 5B, when main signal light and supervisory signal light $\lambda_{sv1}$ are transmitted from an end-office system (not shown) to the up optical fiber transmission line 21a, the back scattered light, which is generated by the scattering of supervisory signal light $\lambda_{sv1}$ to pass through the optical coupler 22a and then to reach downstream., goes backward on the optical fiber transmission line 21a, passing sequentially through the optical coupler 22a, optical fiber grating 24a, optical fiber 23, optical coupler 22b and down optical fiber transmission line 21b, then returning to the end-office system that transmitted the supervisory signal light $\lambda_{sv1}$. Also, supervisory signal light $\lambda_{sv2}$ is divided by the optical coupler 22a, passing through the optical fiber 23, optical coupler 22b, optical fiber grating 24b, optical coupler 22b, optical fiber transmission line 21b (reverse direction), (scattering), and optical fiber transmission line 21b (forward direction), returning to the end-office system that transmitted the supervisory signal light $\lambda_{sv2}$. Thus, the transmission line supervising system of the end-office system can monitor the optical bypass circuit. Moreover, it does not affect the main signal light to propagate through the optical fiber transmission line.

For the supervisory signal light bypass circuit 20C in FIG. 5C, when main signal light and supervisory signal light $\lambda_{sv1}$ are transmitted from an end-office system (not shown) to the up optical fiber transmission line 21a, the supervisory signal light $\lambda_{sv1}$ is divided by the optical coupler 22a, passing sequentially through the optical fiber 23, optical coupler 22b, optical fiber grating 24a, optical coupler 22b and down optical fiber transmission line 21b (forward direction), then returning to the end-office system that transmitted the supervisory signal light $\lambda_{sv1}$. Thus, the transmission line supervising system of the end-office system can monitor the optical bypass circuit. Moreover, it does not affect the main signal light to propagate through the optical fiber transmission line.

For the supervisory signal light bypass circuit 20D in FIG. 5D, when main signal light and supervisory signal light $\lambda_{sv1}$ are transmitted from an end-office system (not shown) to the up optical fiber transmission line 21a, the supervisory signal light $\lambda_{sv1}$ is divided by the optical coupler 22a, passing sequentially through the optical fiber grating 24a, optical coupler 22a, optilcal fiber 23, optical coupler 22b and down optical fiber transmission line 21b (forward direction), then returning to the end-office system that transmitted the supervisory signal light $\lambda_{sv1}$. Thus, the transmission line supervising system of the end-office system can monitor the optical bypass circuit. Moreover, it does not affect the main signal light to propagate through the optical fiber transmission line.

Next, an optical amplifying repeater according to the invention that is composed using the supervisory signal light bypass circuits shown in FIGS. 5A to 5D will be explained.

Figure 7:
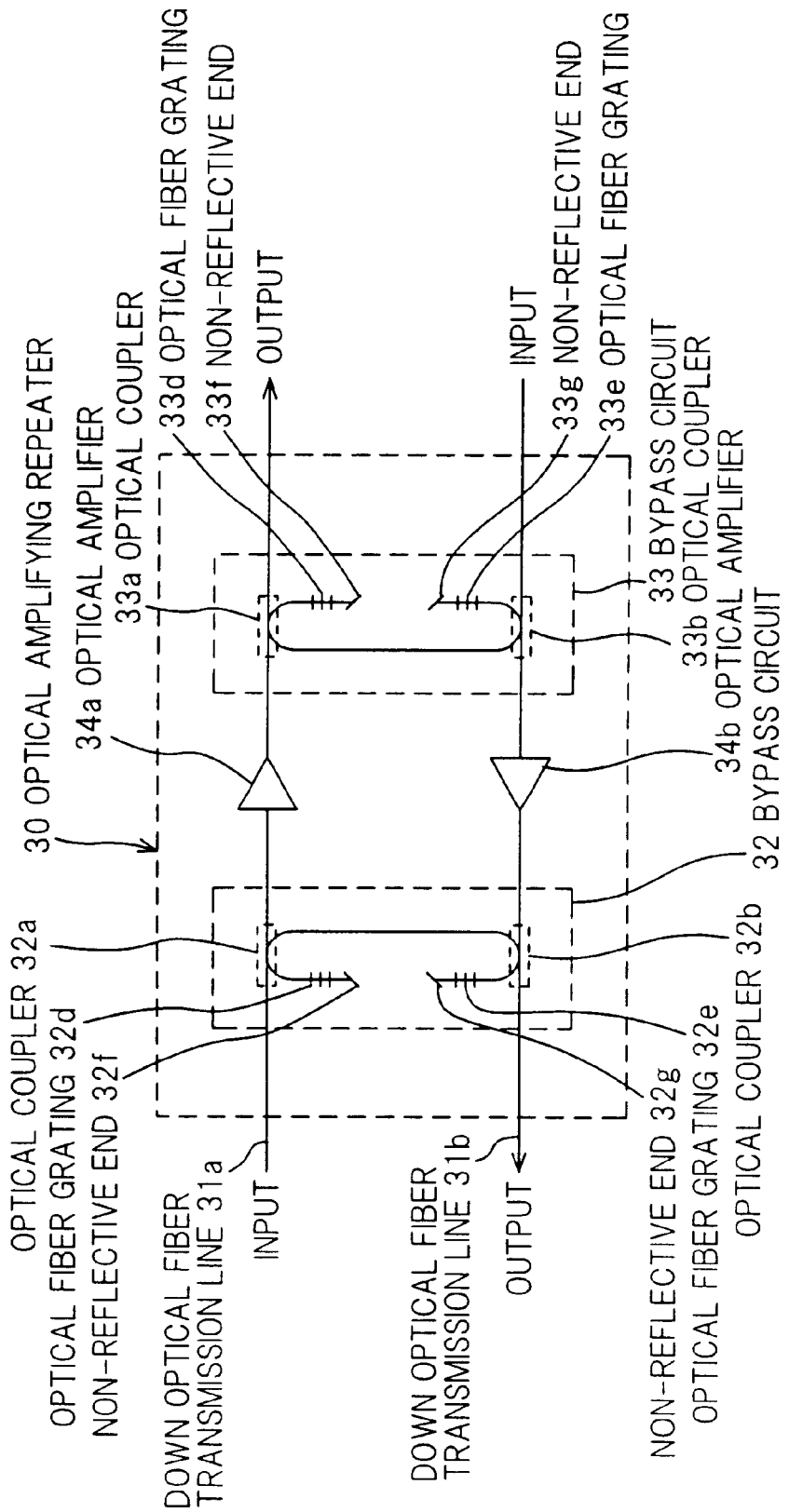
FIG. 7 is a connection diagram showing the basic composition of an optical amplifying repeater in a first preferred embodiment that supervisory signal light bypass circuits according to the invention are provided.

FIG. 7 shows the basic composition of an optical amplifying repeater that the supervisory signal light bypass circuit of the invention is mounted. The optical amplifying repeater 30 in FIG. 7 is composed of the supervisory signal light bypass circuit composed as shown in FIG. 5B, the supervisory signal light bypass circuit composed as shown in FIG. 5A, and optical amplifiers disposed on the up and down optical fiber transmission lines.

In the optical amplifying repeater 30, supervisory signal light bypass circuits 32, 33 are disposed on an up optical fiber transmission line 31a and a down optical fiber transmission line 31b, respectively, and optical amplifiers 34a, 34b are disposed between the supervisory signal light bypass circuits 32, 33. The optical amplifier 34a is disposed on the up optical fiber transmission line 31a, and the optical amplifier 34b is disposed on the uploptical fiber transmission line 31b.

The supervisory signal light bypass circuit 32 is composed of a 2×2 optical coupler 32a on the up optical fiber transmission line 31a, a 2×2 optical coupler 32b on the up optical fiber transmission line 31b, an optical fiber 32c connecting between one end of the 2×2 optical coupler 32a and one end of the optical coupler 32b, an optical fiber grating 32d connected to another end of the 2×2 optical coupler 32a, an optical fiber grating 32e connected to another end of the 2×2 optical coupler 32b, a non-reflective end 32f provided at the end of the optical fiber grating 32d, and a non-reflective end 32g provided at the end of the optical fiber grating 32e. The respective non-reflective ends absorb signal light to pass through the optical fiber grating, thereby preventing the reflection to the side of the optical fiber grating.

The supervisory signal light bypass circuit 33 is composed of a 2×2 optical coupler 33a on the up optical fiber transmission line 31a, a 2×2 optical coupler 33b on the up optical fiber transmission line 31b, an optical fiber 33c connecting between one end of the 2×2 optical coupler 33a and one end of the optical coupler 33b, an optical fiber grating 33d connected to another end of the 2×2 optical coupler 33a, an optical fiber grating 33e connected to another end of the 2×2 optical coupler 33b, a non-reflective end 33f provided at the end of the optical fiber grating 33d, and a ndn-reflective end 33g provided at the end of the optical fiber grating 33e.

As described in FIGS. 6A and 6B, supervisory signal light is bypassed before and after the optical amplifiers 34a, 34b, then returning to the end-office system that transmitted the supervisory signal light. Therefore, the transmission line supervising system of the end-office system can monitor the optical bypass circuit. Moreover, it does not affect the main signal light to propagate through the optical fiber transmission line. In addition, both the main signal light and supervisory signal light to pass through the optical amplifiers 34a, 34b are amplified by the optical amplifiers 34a, 34b. Thus, the function of the optical amplifying repeater 30 can be brought out.

Also, the optical amplifying repeater 30 in FIG. 7 can be used as a device of an optical fiber transmission system. An optical fiber transmission system according to the invention will be explained below.

Figure 8:
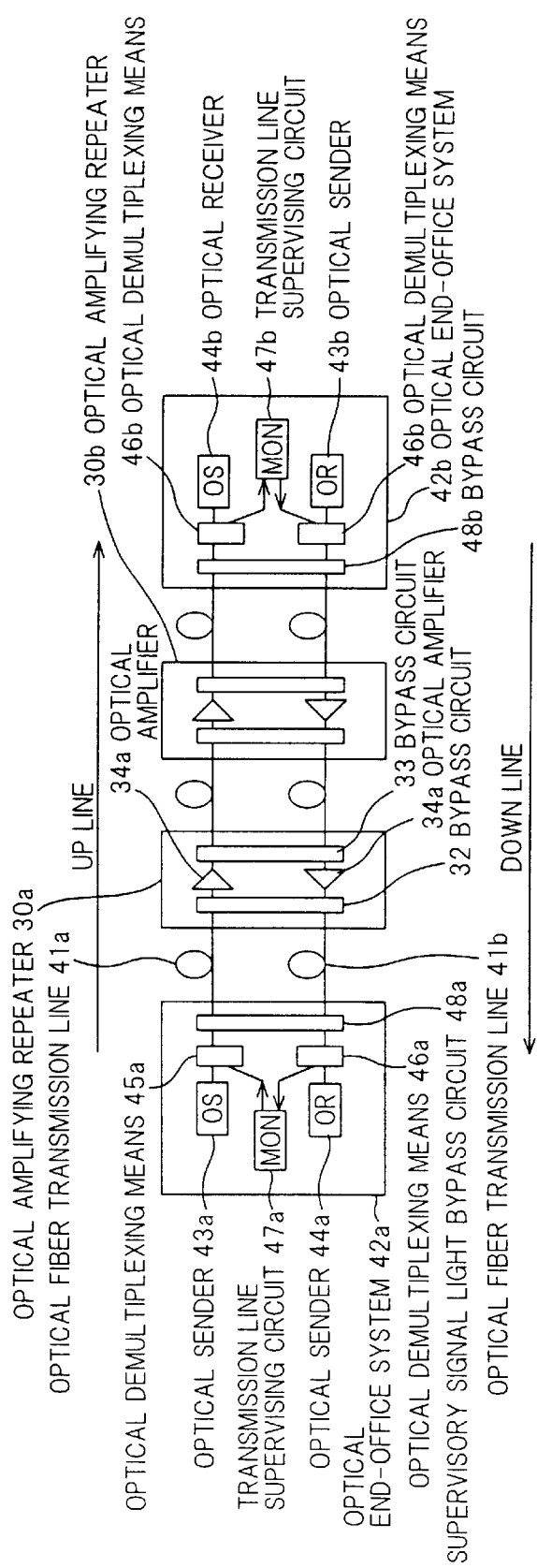
FIG. 8 is a connection diagram showing an optical fiber transmission system in a preferred embodiment according to the invention.

FIG. 8 shows an optical fiber transmission system in a first preferred embodiment of the invention. An optical fiber transmission system 40 in FIG. 8 is composed of a pair, of up and down optical fiber transmission lines 41a, 41b, optical end-office systems 42a, 42b connected to both ends of the optical fiber transmission lines 41a, 41b, and optical amplifying repeaters 30a, 30b. The optical amplifying repeaters 30a, 30b have the same composition as shown in FIG. 7. The optical fiber transmission lines 41a, 41b and optical amplifying repeaters 30a, 30b each can transmit both of main signal light and supervisory signal light with different wavelengths.

The optical fiber transmission lines 41a, 41b and optical amplifying repeaters 30a, 30b each are provided with the supervisory signal light bypass circuit, whereby only the supervisory signal light can pass through between the up optical fiber transmission line 41a and the optical fiber transmission line 41b.

The optical end-office system 42a is composed of an optical sender (OS) 43a, an optical receiver (OR) 44a, an optical multiplexing means 45a, an optical demultiplexing means 46a, a transmission line supervising circuit (MON) 47a, and a supervisory signal light bypass circuit 48a. Similarly, the optical end-office system 42b is composed of an optical sender (OS) 43b, an optical receiver (OR) 44b, an optical multiplexing means 45b. an optical demultiplexing means 46b, a transmission line supervising circuit (MON) 47b, and a supervisory signal light bypass circuit 48b. The supervisory signal light bypass circuit 48a (48b) supplies supervisory signal light to the optical multiplexing means 45a (45b), obtaining supervisory signal light from the optical demultiplexing means 46a (46b). To the optical multiplexing means 45a (45b), the optical sender 43a (43b) and transmission line supervising circuit 47a (47b) are connected. To the optical demultiplexing means 46a (46b), the optical receiver 44a (44b) and transmission line supervising circuit 47a (47b) are connected. Further, to the optical multiplexing means 45a (45b) and optical demultiplexing means 46a (46b), the supervisory signal light bypass circuit 48a (48b) is connected. To the supervisory signal lightbypass circuit 48a (48b), the optical fiber transmission lines 41a, 41b are connected.

Figure 9:
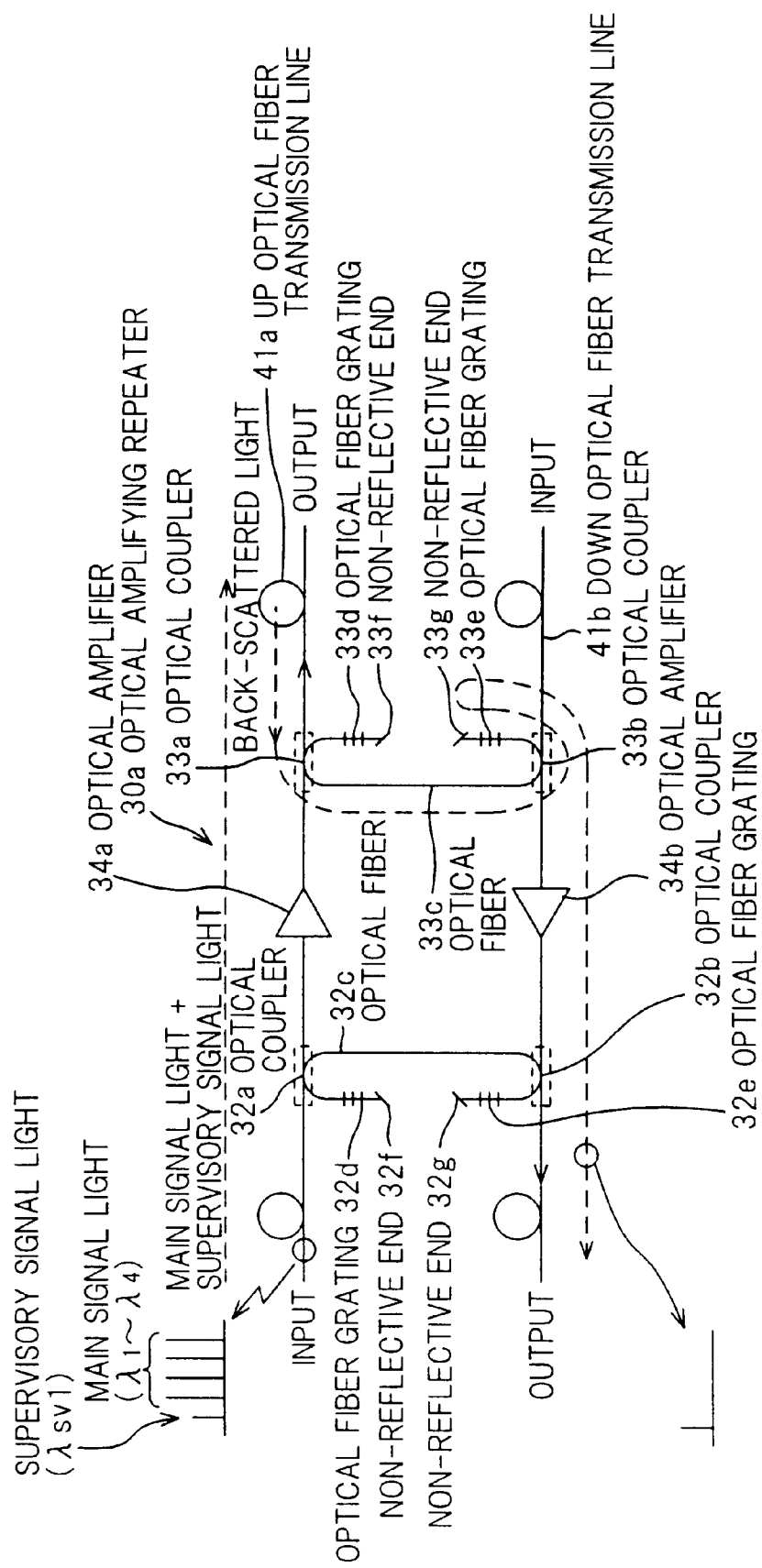
FIG. 9 is an illustration showing the path of first supervisory signal light in an optical amplifying repeater of the optical fiber transmission system in FIG. 8.

FIG. 9 shows the path of supervisory signal light with a wavelength $\lambda_{sv1}$ in the optical amplifying repeater 30a of the optical fiber transmission system 40 in FIG. 8. Namely, it shows the supervisory operation when supervisory signal light $\lambda_{sv1}$ is transmitted from the optical end-office system 42a through the optical fiber transmission line 41a to the optical amplifying repeater 30a. An optical signal transmitted on the optical fiber transmission line 41a is optically amplified by the up optical amplifier 34a of the optical amplifying repeater 30a, then output to the side of optical coupler 33a on the optical fiber transmission line 41a. The back scattered light of optical signal passing through the optical coupler 33a returns from the optical fiber transmission line 41a to the optical amplifying repeater 30a, divided by the optical coupler 33a, bypassed to the down optical fiber transmission line 41b. The back scattered light bypassed to the down line passes through the optical coupler 33b, and only the wavelength component of supervisory signal light is reflected by the optical fiber grating 33e, passing through the optical coupler 33b again, coupled to the optical fiber transmission line 41b. Thus, the back scattered light of supervisory signal light $\lambda_{sv1}$ from the up optical fiber transmission line 41a returns to the optical end-office system 42a through the optical fiber transmission line 41b. Therefore, the transmission line supervising circuit 47a can monitor the supervisory signal light bypass circuit 33.

Figure 10:
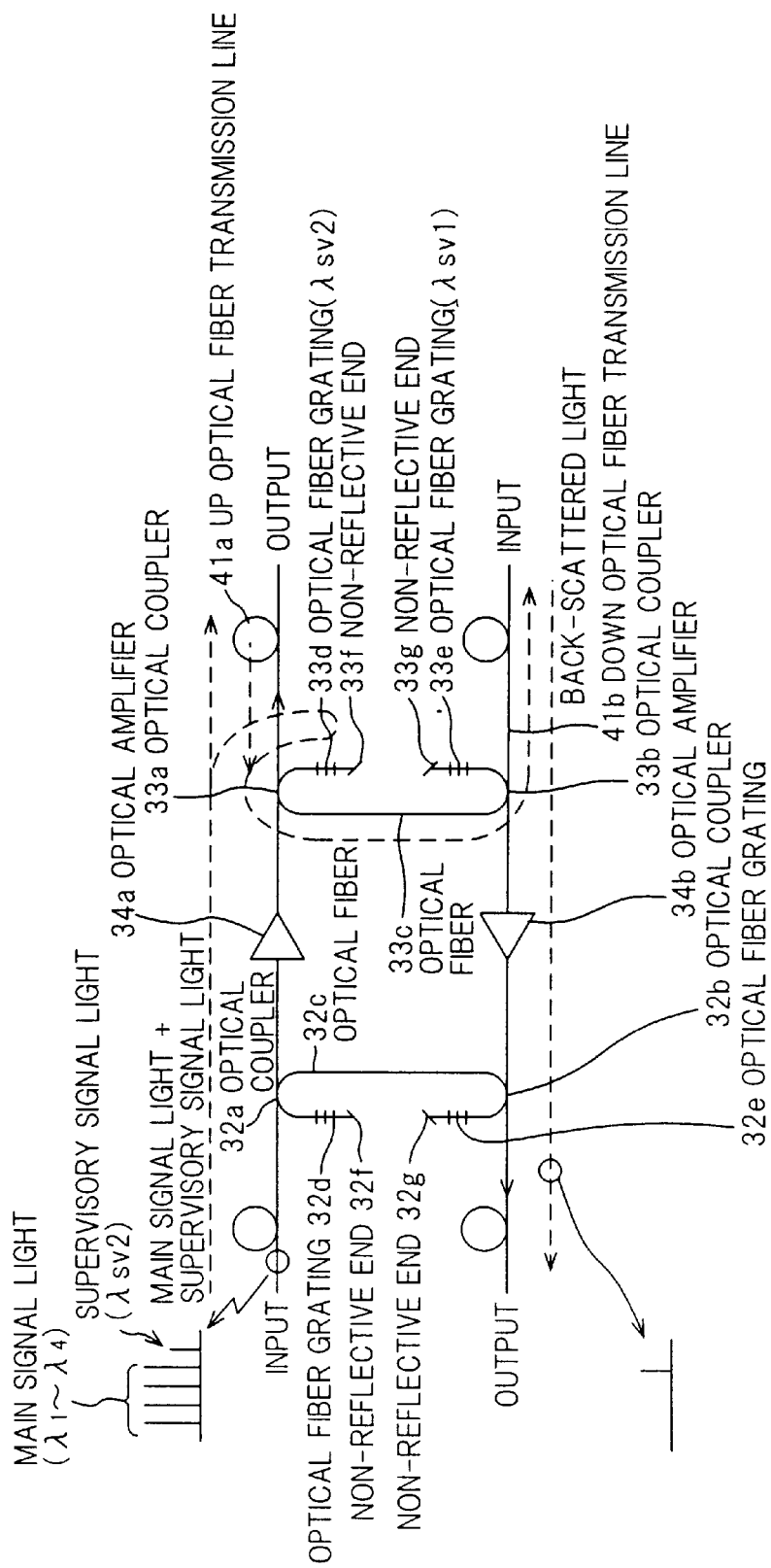
FIG. 10 is an illustration showing the path of second supervisory signal light in an optical amplifying repeater of the optical fiber transmission system in FIG. 8.

FIG. 10 shows the path of supervisory signal light with a wavelength $\lambda_{sv2}$ in the optical amplifying repeater 30a of the optical fiber transmission system 40 in FIG. 8. Namely, it shows the supervisory operation when supervisory signal light $\lambda_{sv2}$ is transmitted from the optical end-office system 42a through the optical fiber transmission line 41a to the optical amplifying repeater 30a. The supervisory signal light $\lambda_{sv2}$ is generated by the transmission line supervising circuit 47a, multiplexed with main signal light by the optical multiplexing means 45a of the optical end-office system 42a, transmitted to the optical fiber transmission line 41a. An optical signal transmitted on the optical fiber transmission line 41a is divided by the optical coupler 33a. Then, only the supervisory signal light $\lambda_{sv2}$ is reflected by the optical fiber grating 33d (reflection wavelength: $\lambda_{sv2}$), passing through the optical coupler 33a again, bypassed to the down optical fiber transmission line 41b. The supervisory signal light $\lambda_{sv2}$ bypassed is coupled to the down optical fiber transmission line 41b by the optical coupler 33b, propagating there through in the reverse direction of main signal light on the optical fiber transmission line 41b. Back scattered light to generate when the supervisory signal light $\lambda_{sv2}$ propagates through the optical fiber transmission line 41b is transmitted to the optical end-office system 42a, with the main signal light on the optical fiber transmission line 41b.

In this composition, the reflection wavelength band width of the optical fiber grating can be designed to be very narrow. Therefore, the main signal light can be removed sufficiently and therefore only the optical component of supervisory signal light can be coupled to the down optical fiber transmission line 41b, even when the wavelength interval between supervisory signal light and main signal light is narrowed.

The supervisory signal light $\lambda_{sv2}$ returning through the optical fiber transmission line 41b is separated from the main signal light by the optical demultiplexing means 46a, then input to the transmission line supervising circuit 47a. Therefore, the transmission line supervising circuit 47a can observe whether the state of the optical amplifying repeaters 34a, 34b and optical fiber transmission lines 41a, 41b is normal or not, based on the information of intensity amplitude, frequency and time difference between the supervisory signal light transmitted and the supervisory signal light received.

In general, optical pulse modulation signal is used to observe the back scattered light from the optical fiber transmission lines 41a, 41b. Like signal can be also used as the signal type of supervisory signal light in this invention. Although as the modulation type of optical pulse, to vary the optical intensity is a mainstreamer, a method of varying the optical frequency and detecting coherently may be used.

FIGS. 11A to 11C show the monitoring result of the optical fiber transmission system when monitoring through the paths shown in FIGS. 9 and 10. FIG. 11A shows the flow of supervisory signal light, where three optical amplifying repeaters 30a, 30b and 30c are disposed between the optical end-office systems 42a and 42b. FIG. 11B shows the variation with time of supervisory signal light $\lambda_{sv1}$, and FIG. 11C shows the variation with time of supervisory signal light $\lambda_{sv2}$. As clearly understood from FIGS. 11A to 11C, by using two supervisory signal lights with different wavelengths $\lambda_{sv1}$, $\lambda_{sv2}$, both of the up and down optical fiber transmission lines 41a, 41b can be monitored simultaneously at one optical end-office system.

Next, an optical amplifying repeater in the second preferred embodiment according to the invention will be explained.

Figure 12:
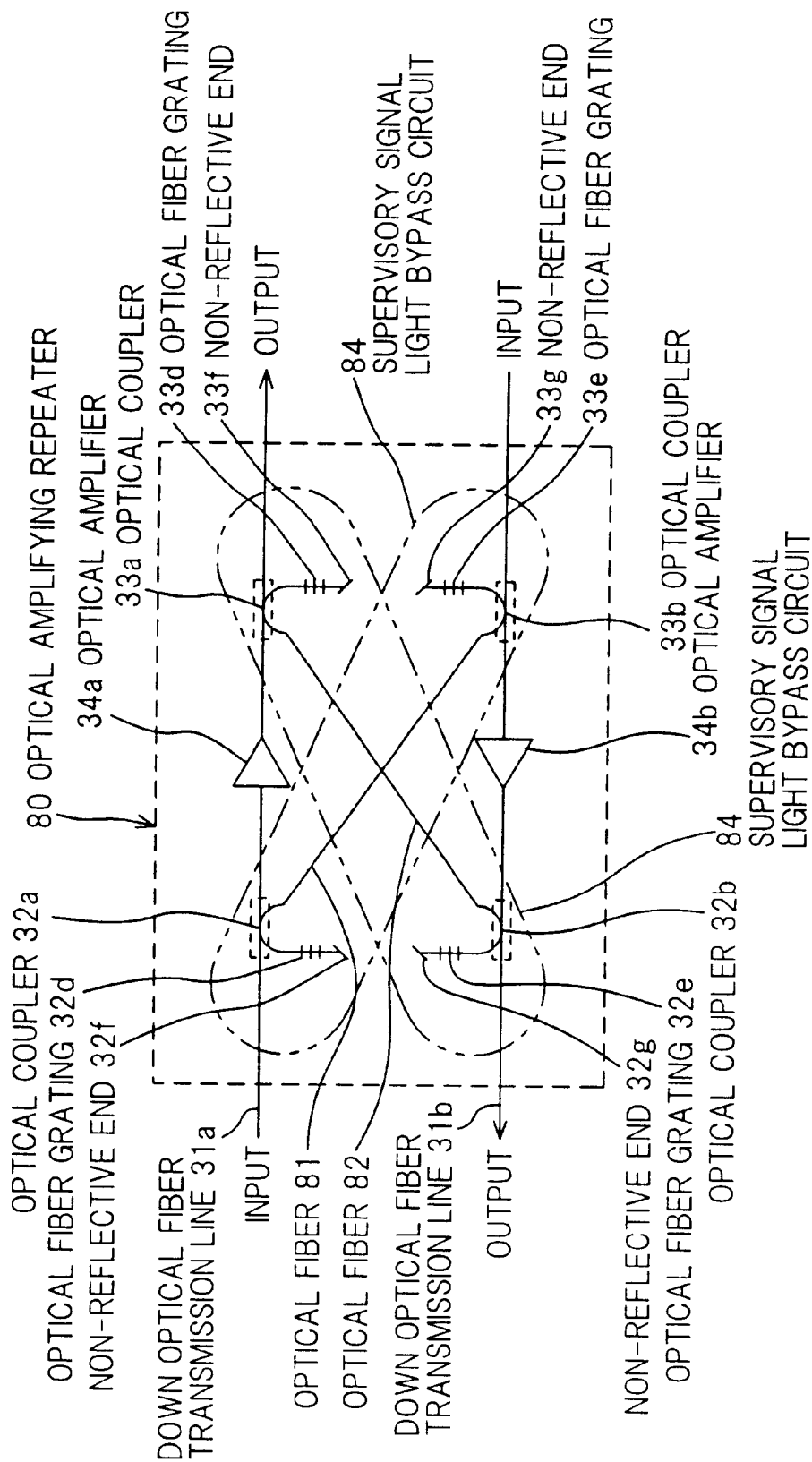
FIG. 12 is a connection diagram showing an optical amplifying repeater in a second preferred embodiment that supervisory signal light bypass circuits according to the invention are provided.

FIG. 12 shows the optical amplifying repeater in the second embodiment using an supervisory signal light bypass circuit according to the invention. In FIG. 12, like parts are, indicated by like reference numerals as used in FIG. 7 and explanations thereto are omitted.

In an optical amplifying repeater 80 in FIG. 12, the respective ends of the optical coupler 32a and optical coupler 33b are connected through an optical fiber 81 and the respective ends of the optical coupler 32b and optical coupler 33a are connected through an optical fiber 82, thereby composing supervisory signal light bypass circuits 83, 84.

Figure 13:
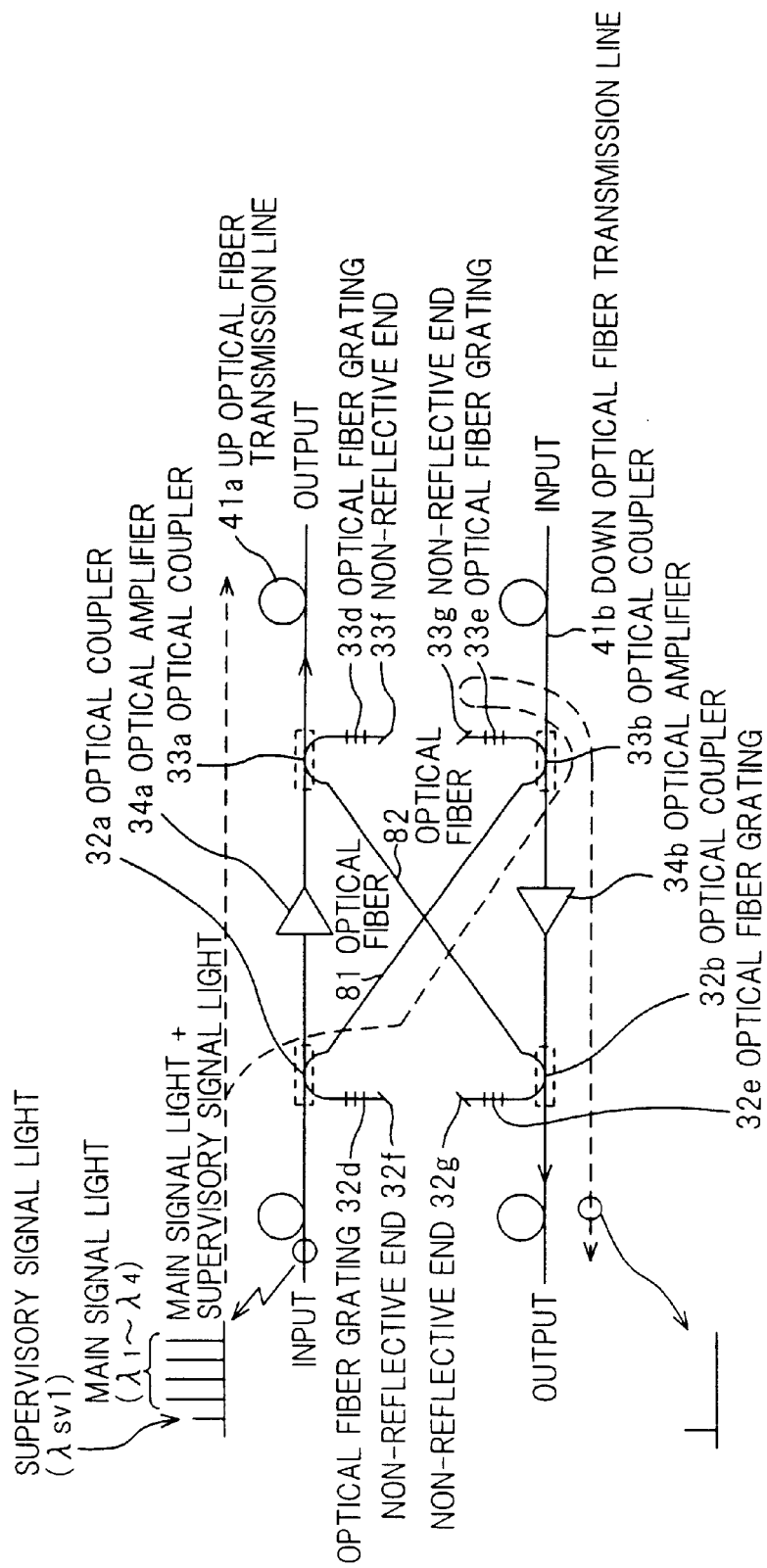
FIG. 13 is an illustration showing the path of supervisory signal light $\lambda_{sv1}$ in the optical amplifying repeater in FIG. 12.

FIG. 13 shows the path of supervisory signal light with a wavelength $\lambda_{sv1}$ in the optical amplifying repeater in FIG. 12. Supervisory signal light $\lambda_{sv1}$ transmitted from the transmission line supervising circuit 47a and main signal light $\lambda_1$ to $\lambda_4$ transmitted from the optical sender 43a are transmitted through the optical fiber transmission line 41a, divided by the optical coupler 32a. The supervisory signal light $\lambda_{sv1}$ divided reaches the optical coupler 33b through the optical fiber 81, reflected by an optical fiber grating 33e, passing through the optical coupler 33b to thel optical fiber transmission line 41b, amplified by the optical amplifier 34b, returning through the optical coupler 32b to the end-office system that transmitted the supervisory signal light. Thus, the transmission line supervising circuit 47a can monitor the supervisory signal light bypass circuit 83.

Also, in monitoring with supervisory signal light $\lambda_{sv1}$, the supervisory signal light $\lambda_{sv1}$ with optical intensity proportional to the optical input level at the upstream of the optical amplifying repeater 80 returns to the optical end-office system 42a through the optical fiber transmission line 41b. Therefore, by detecting the intensity of the supervisory signal light $\lambda_{sv1}$ recbived by the transmission line supervising circuit 47a, whether theloptical input level to the down optical amplifier 34b is suitable or not can be monitored.

Although in FIG. 13, the supervisory signal light bypass circuits 32, 33 are accommodated in the optical amplifying repeater 80, they may be inserted into the up and down optical fiber transmission lines 31a, 31b.

Figure 14:
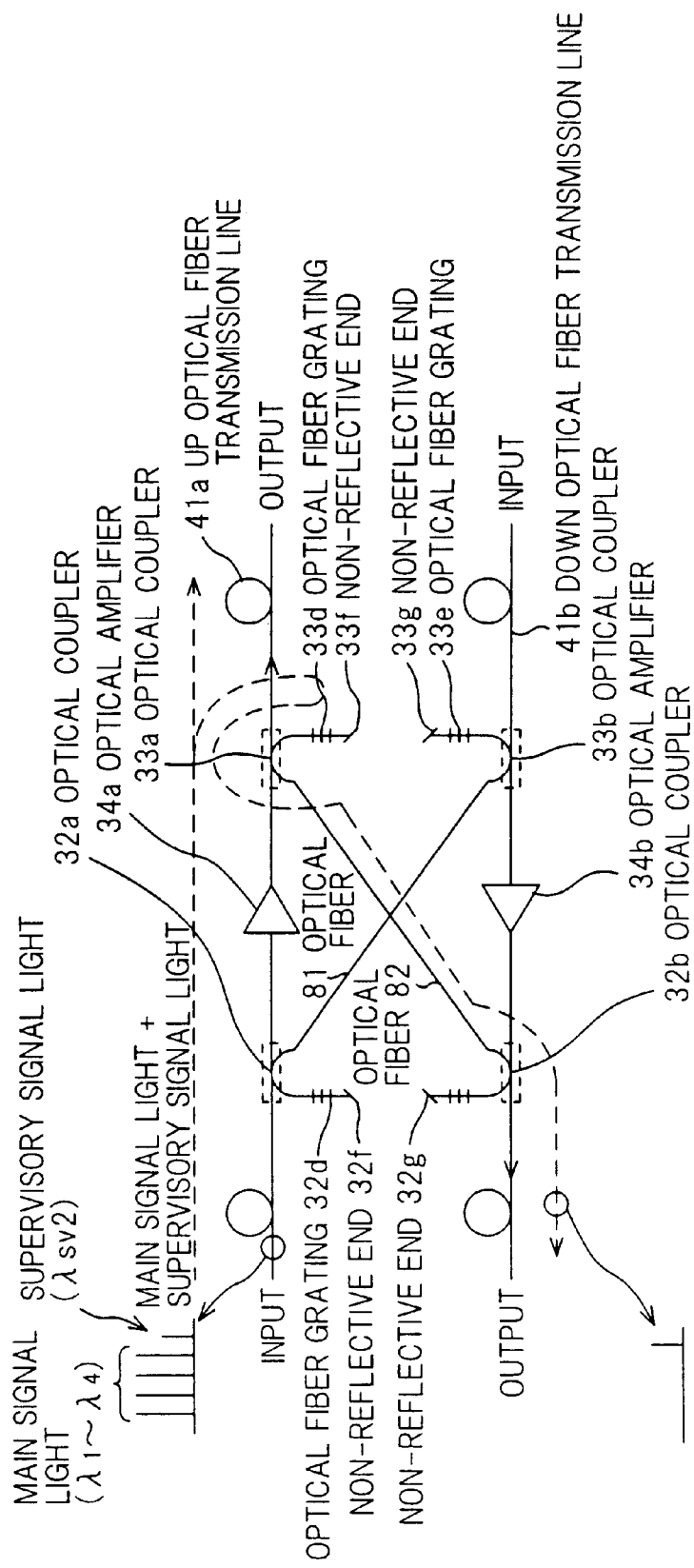
FIG. 14 is an illustration showing the path of supervisory signal light in monitoring an optical bypass circuit in the optical amplifying repeater in FIG. 12.

FIG. 14 shows the path of supervisory signal light in monitoring the optical bypass circuit 84 of the optical amplifying repeater 80 in FIG. 12.

Supervisory signal light $\lambda_{sv2}$ transmitted from the transmission line supervising circuit 47a and main signal light $\lambda_1$ to $\lambda_4$ transmitted from the optical sender 43a are transmitted through the optical fiber transmission line 41a, passing through the optical coupler 32a and optical amplifier 34a to the optical coupler 33b, divided by the optical coupler 33b. The main signal light is transmitted unalteredly to the optical end-office system 42b. The supervisory signal light $\lambda_{sv2}$ divided passes through the optical coupler 33a, optical fiber 82, optical coupler 32b and optical fiber transmission line 41b to the optical end-office system 42a, thus returning to the transmission line supervising circuit 47a. Therefore, the transmission line supervising circuit 47a can monitor the supervisory signal light bypass circuit 84.

Also, in monitoring with supervisory signal light $\lambda_{sv2}$, the supervisory signal light $\lambda_{sv2}$ with optical intensity proportional to the optical input level at the upstream of the optical amplifying repeater 80 returns to the optical end-office system 42a through the optical fiber transmission line 41b. Therefore, by detecting the intensity of the supervisory signal light $\lambda_{sv2}$ received by the transmission line supervising circuit 47a, whether the optical output level from the up optical amplifier 34a is suitable or not can be monitored.

As shown in FIGS. 13 and 14, the optical amplifying repeater 80 of the invention can change the path to be bypassed into the input side or output side, by changing the wavelength of supervisory signal light. Therefore, the optical input level or optical output level of the optical amplifying repeater can be monitored separately.

FIGS. 15A to 15C show the monitoring result of the optical fiber transmission system when monitoring through the paths shown in FIGS. 13 and 14. FIG. 15A shows the flow of supervisory signal light, where three optical amplifying repeaters 30a, 30b and 30c are disposed between the optical end-office systems 42a and 42b. FIG. 15B shows the variation with time of supervisory signal light $\lambda_{sv1}$, and FIG. 15C shows the variation with time of supervisory signal light $\lambda_{sv2}$. As clearly understood from FIGS. 15A to 15C, by using two supervisory signal lights with different wavelengths $\lambda_{sv1}$, $\lambda_{sv2}$, both of the optical input level and optical output level of the up optical amplifying repeaters can be monitored simultaneously at the up optical end-office system.

Figure 16:
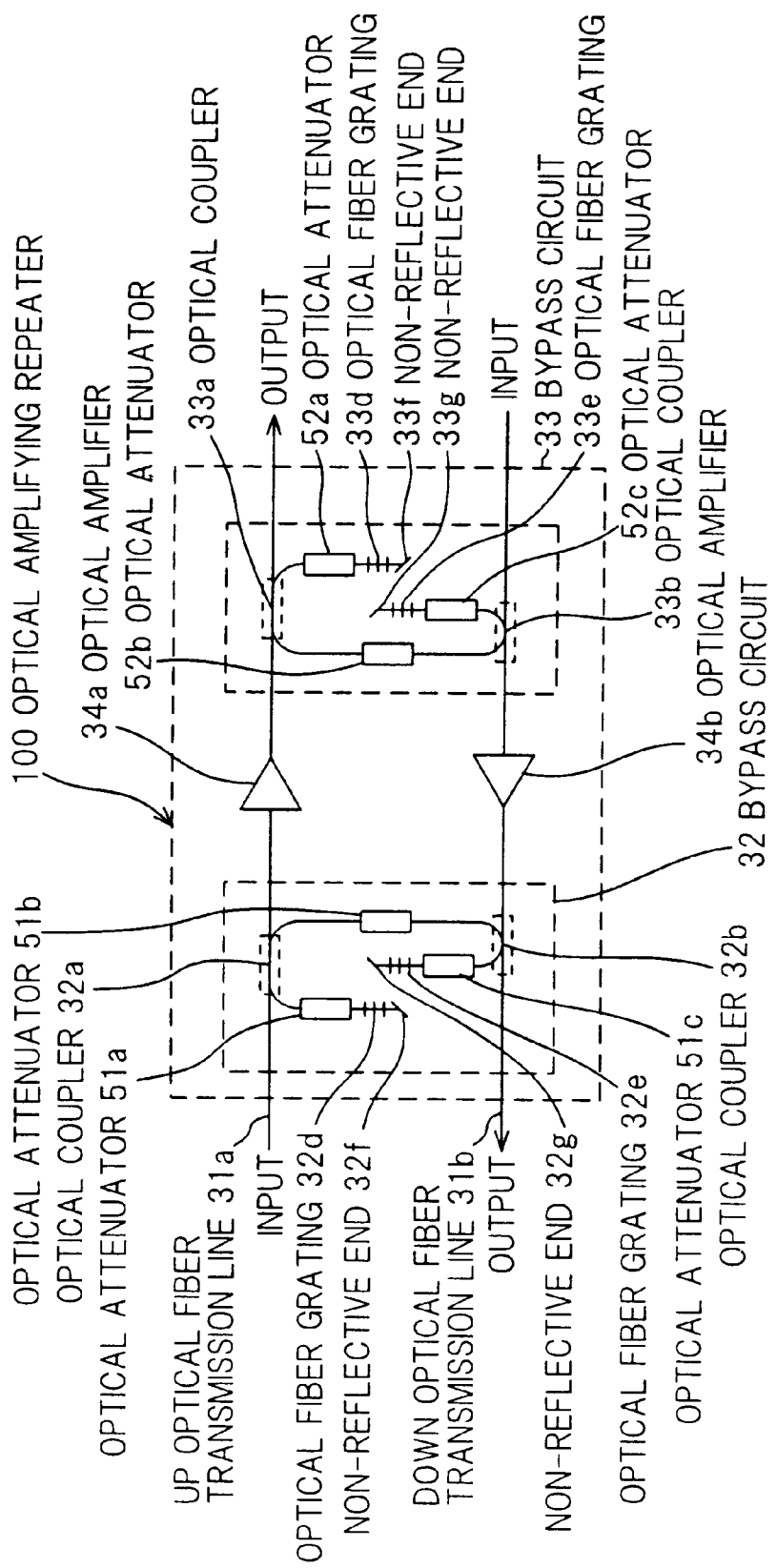
FIG. 16 is a connection diagram showing an optical amplifying repeater in a third preferred embodiment according to the invention.

FIG. 16 shows an optical amplifying repeater in the third preferred embodimentaccordingto the invention. In this embodiment, each of the optical fibers and optical fiber gratings of the supervisory signal light bypass circuits 32, 33 in the optical amplifying repeater 30 shown in FIG. 7 is provided with an optical attenuator, thereby composing an optical amplifying repeater 100. In the supervisory signal light bypass circuit 32, an optical attenuator 51a in series to the optical fiber grating 32d, an optical attenuator 51b in the optical fiber 32c, and an optical attenuator 51c in series to the optical fiber grating 32e are provided. Also, in the supervisory signal light bypass circuit 33, an optical attenuator 52a in series to the optical fiber grating 33d, an optical attenuator 52b in the optical fiber 33c, and an opticlal attenuator 52c in series to the optical fiber grating 33e are provided. With the optical attenuators 51a to 51c and 52a to 52c, the loss amount can be set easily and the bypassing amount of supervisory signal light can be set arbitrarily.

As the optical couplers in the above embodiments, an optical coupler generally-known can be used.

Using an optical fiber grating as the optical gratings in the above embodiments, a bypass circuit with low loss and high reliability can be configured. Also, as the optical grating, an optical waveguide type can be used.

Figure 17:
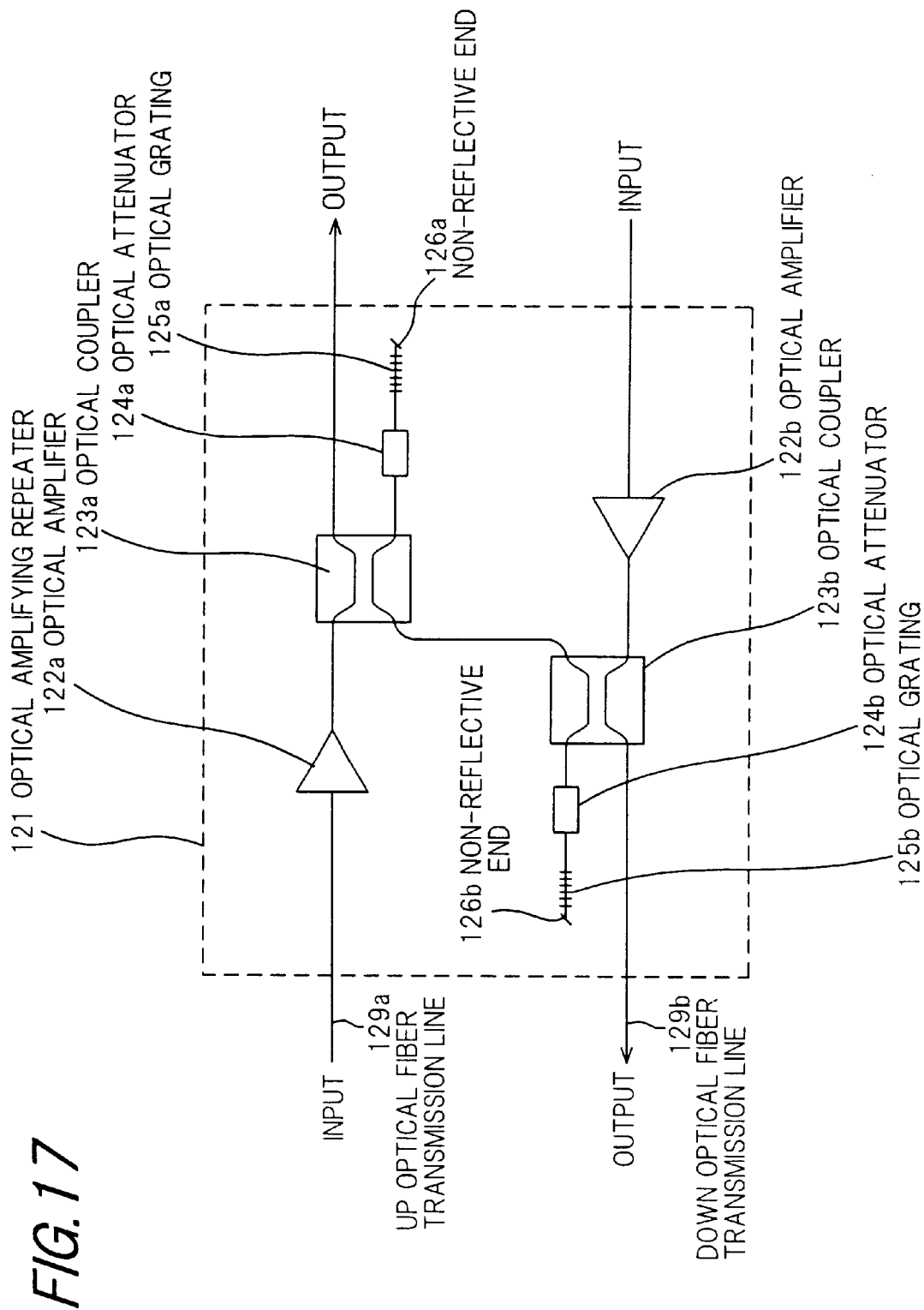
FIG. 17 is a connection diagram showing an optical amplifying repeater in a fourth preferred embodiment according to the invention.
Figure 18:
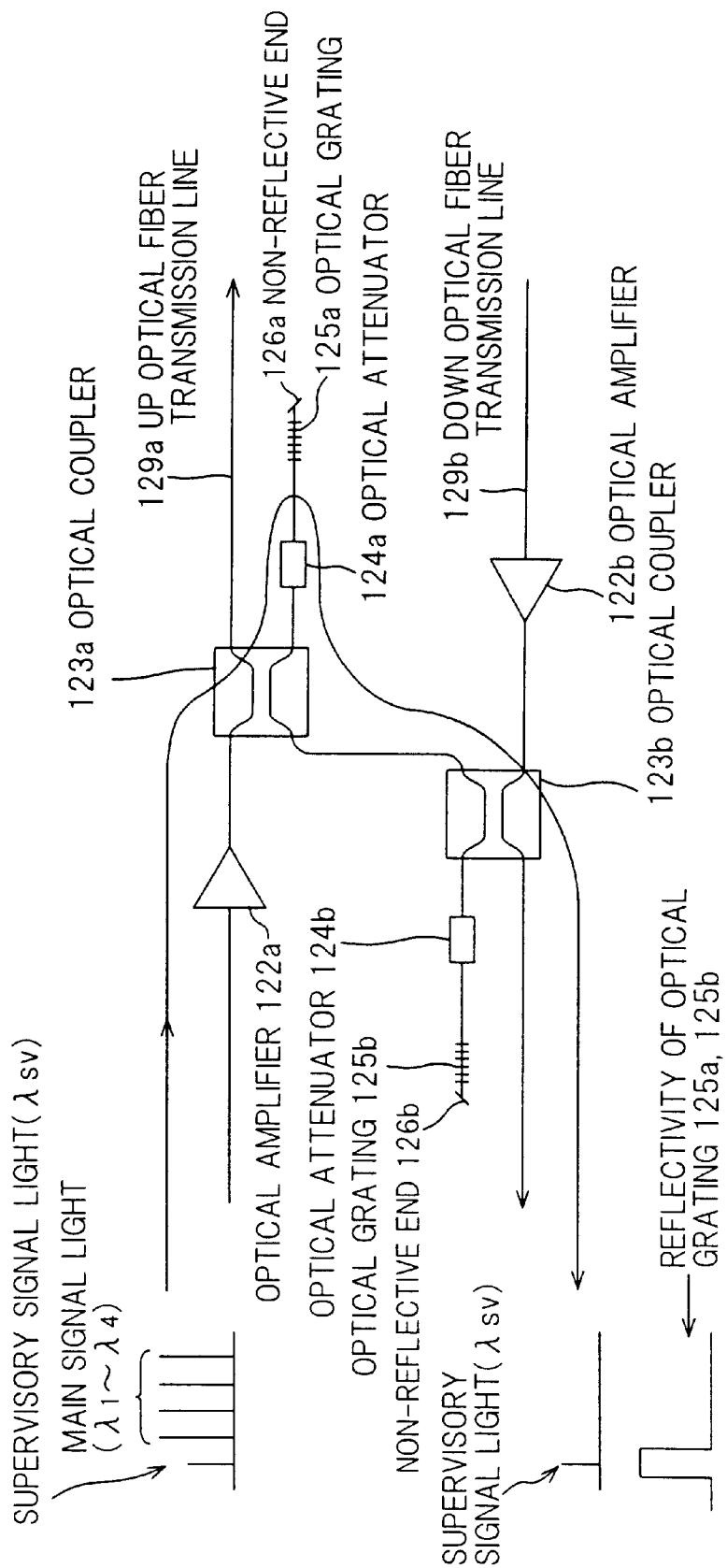
FIG. 18 is an illustration showing the transfer operation of supervisory signal light in the optical amplifying repeater in FIG. 17.

FIG. 17 shows an optical amplifying repeater, which is capable of being monitored through supervisory signal light from an end-office system, in the fourth preferred embodiment according to the invention. FIG. 18 shows the transfer operation of supervisory signal light in the optical amplifying repeater.

In an optical amplifying repeater 121, an optical amplifier 122a and an optical coupler (2×2) 123a are disposed in the direction of the input side to output side of an up optical fiber: transmission line 129a, and an optical amplifier 122b and an optical coupler (2×2) 123b are disposed in the direction of the input side to output side of a down optical fiber transmission line 129b. Further, to one input/output port of the optical coupler 123a, 123b, an up/down optical attenuator 124a, 124b, an optical grating 1215a, 125b, and a non-reflective end 126a, 126b are in series connected.

Further detailing this composition, the input port of the optical amplifier 122a is used as the input port of the up optical fiber transmission line 129a, and the output port of the optical amplifier 122a is connected to one input port of the optical coupler 123a. Also, one output port of the optical coupler 123a is used as the output port of the up optical fiber transmission line 129a, and another input/output port of the optical coupler 123a is connected to the input port of the optical attenuator 124a. Further, the output port of the optical attenuator 124a is connected to the input port of the optical grating 125a, and the output port of the optical grating 125a is connected to the non-reflective end 126a.

Similarly, the input port of the optical amplifier 122b is used as the input port of the down optical fiber transmission line 129b, and the output port of the optical amplifier 122b is connected to one input port of the optical coupler 123b. Also, one output port of the optical coupler 123b is used as the output port of the down optical fiber transmission line 129b, and another input/output port of the optical coupler 123b is connected to the input port of the optical attenuator 124b. Further, the output port of the optical attenuator 124b is connected to the input port of the optical grating 125b, and the output port of the optical grating 125b is connected to the non-reflective end 126b.

Further, the other input/output port of the optical coupler 123a is connected to the other input/output port of the optical coupler 123b.

Here, the optical amplifiers 122a, 122b have a function to amplify, at a given amplitude factor, main signal light and supervisory signal light to propagate through the up and down optical fiber transmission lines 129a, 129b.

The optical couplers 123a, 123b have a function to divide/couple part of main signal light and supervisory signal light to be amplified by the optical amplifiers 122a, 122b. For example, they are of an optical fiber coupler.

The optical attenuators 124a, 124b have a function to attenuate, at a given attenuation factor, main signal light and supervisory signal light to be divided by the optical couplers 123a, 123b. For example, they are of metal-doped optical fiber that metal is doped into the core of an optical fiber.

The optical gratings 125a, 125b have a function to transmit only main signal light with a predetermined wavelength of main signal light and supervisory signal light to be attenuated by the optical attenuators 124a, 124b to diffuse it by the non-reflective ends 126a, 126b, and to reflect on the supervisory signal light with a predetermined wavelength. For example, they are of an optical fiber grating or an optical waveguide grating.

With this composition, a case that main signal light with four wavelengths ($\lambda_1$ to $\lambda_4$) multiplexed and supervisory signal light with another wavelength ($\lambda_{sv}$) as shown by the spectra of signal light in FIG. 18, where the vertical axis indicates optical intensity and the horizontal axis indicates optical wavelength, are transmitted from an end-office system (not shown) to the up optical fiber transmission line 129a is explained below.

The main signal light and supervisory signal light are amplified by the optical amplifier 122a, divided by the optical,coupler 123a. Then, the main signal light and supervisory signal light divided are attenuated by the optical attenuator 124a, then the main signal light transmits through the optical grating 125a and is diffused by the non-reflective end 126a, only the supervisory signal light reflects at a reflectivity shown in FIG. 18.

Then the supervisory signal light reflected passes through the optical attenuator 124a again, coupled with signal light propagating through the down optical fiber transmission line 129b by the optical coupler 123b, returning to the end-office system that transmitted the main signal light and supervisory signal light.

In this composition, the reflection wavelength band width of the optical gratings 125a, 125b can be designed to be very narrow. Therefore, only the main signal light can be transmitted and only the supervisory signal light can be reflected, even when the wavelength interval between supervisory signal light and main signal light is narrowed.

So, the transmission line supervising circuit of end-office system can take out only supervisory signal light without affecting main signal light, and therefore can precisely monitor the optical amplifying repeater 121.

Also, the optical path connecting between the up and down optical fiber transmission lines 129a, 129b only has to be of one optical path connecting between the optical couplers 123a, 123b. Therefore, the optical amplifying repeater 121 can be composed simply and can be fabricated easily.

Figure 19:
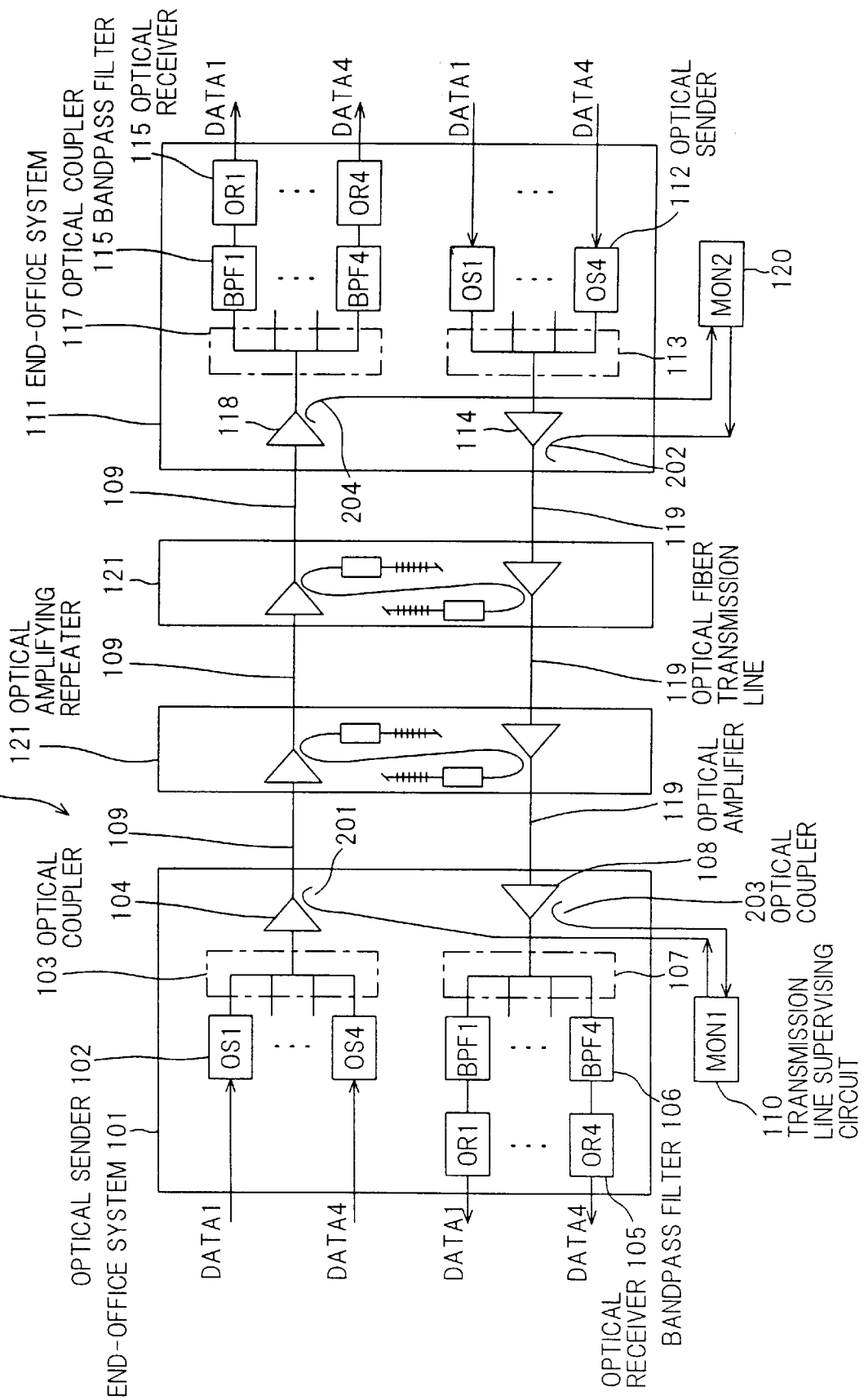
FIG. 19 is a connection diagram showing an optical transmission system that the optical amplifying repeater in FIG. 17 is mounted.

FIG. 19 shows an optical transmission system that the optical amplifying repeater 121 is mounted.

In an optical transmission system 100, multiple optical senders 102, 112 in transmission/reception end-office systems 101, 111 are connected to optical couplers 103, 113 and optical amplifiers 104, 114, and multiple optical receivers 105, 115 are connected to optical bandpass filters 106, 116, optical couplers 107, 117 and optical amplifiers 108, 118.

Also, the optical amplifiers 104, 108 and optical amplifiers 114, 118 are connected through two optical fiber transmission lines 109 and 119, respectively. The multiple optical amplifying repeaters 121 are disposed on the optical fiber transmission lines 109a, 119. Further, transmission line supervising circuits 110, 120 each are connected to the output ends of the optical amplifiers 104, 114, 108 and 118.

In this composition, main signal light with different wavelengths to be transmitted from the optical senders 102, 112 of the one-end transmission/reception end-office systems 101, 111 is coupled by the optical couplers 103, 113, amplified by the optical amplifiers 104, 114, sent through the optical fiber transmission lines 109, 119 to the other-end transmission/reception end-office systems 111, 101.

Then, the main signal light sent is amplified by the optical amplifiers 118, 108 of the other-end transmission/reception endoffice systems 111, 101, divided by the optical couplers 117, 107, wavelength-selected by the bandpass filters 116, 106, received by the optical receivers 115, 105.

On the other hand, supervisory signal light to be transmitted superposing a supervisory signal by any modulation system of optical intensity modulation, optical frequency modulation and optical phase modulation at the transmission line supervising circuits 110, 120 is coupled with the main signal light by optical couplers 201, 202, sent to the optical fiber transmission lines 109, 119.

Then, as described earlier, by the operation of the optical amplifying repeater 121 on the transmission lines, only the supervisory signal light is transferred to the opposite-line optical fiber transmission lines 119, 109, passing through the optical couplers 203, 204, received by the transmission line supervising circuits 120, 110.

Therefore, the transmission line supervising circuits 120, 110 can monitor whether the respective optical amplifying repeaters 121 operate normally or not, based on the information of intensity, amplitude, frequency and time difference between the supervisory signal light transmitted and the supervisory signal light received.

Figure 20:
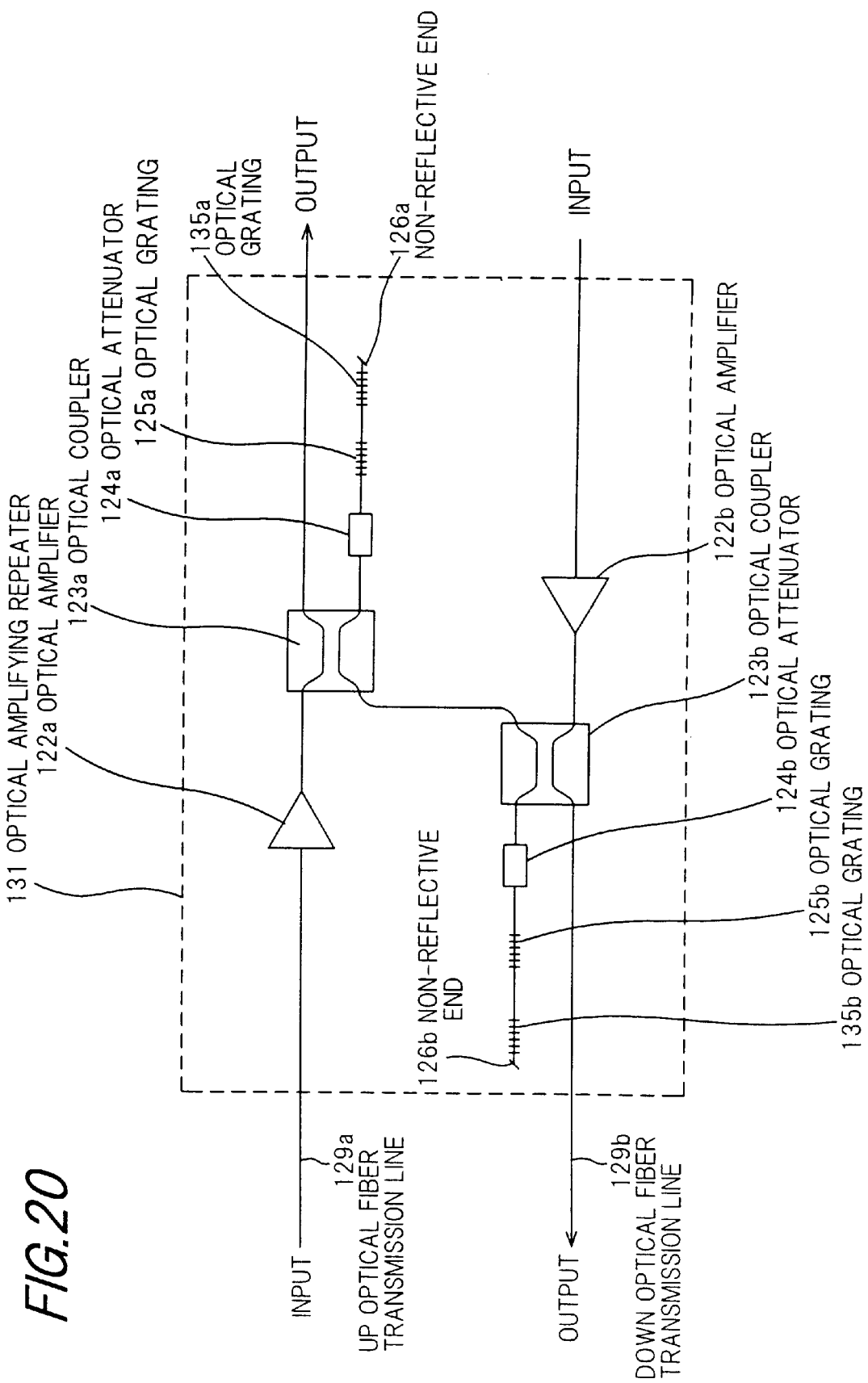
FIG. 20 is a connection diagram showing an optical amplifying repeater in a fifth preferred embodiment according to the invention.

FIG. 20 shows an optical amplifying repeater, which is capable of being monitored through supervisory signal light from an end-office system, in the fifth preferred embodiment according to the invention.In FIG. 20, like parts are indicated by like reference numerals as used in FIG. 17 and explanations thereto are omitted.

An optical amplifying repeater 131 in this embodiment is different from the optical amplifying repeater 121 in FIG. 17 in that optical gratings 135a, 135b are further in series connected to the optical attenuators 124a, 124b and optical gratings 125a, 125b.

With this composition, multiple supervisory signal lights with different wavelengths can be transferred and therefore the optical amplifying repeater 131 can be monitored further in detail.

Figure 21:
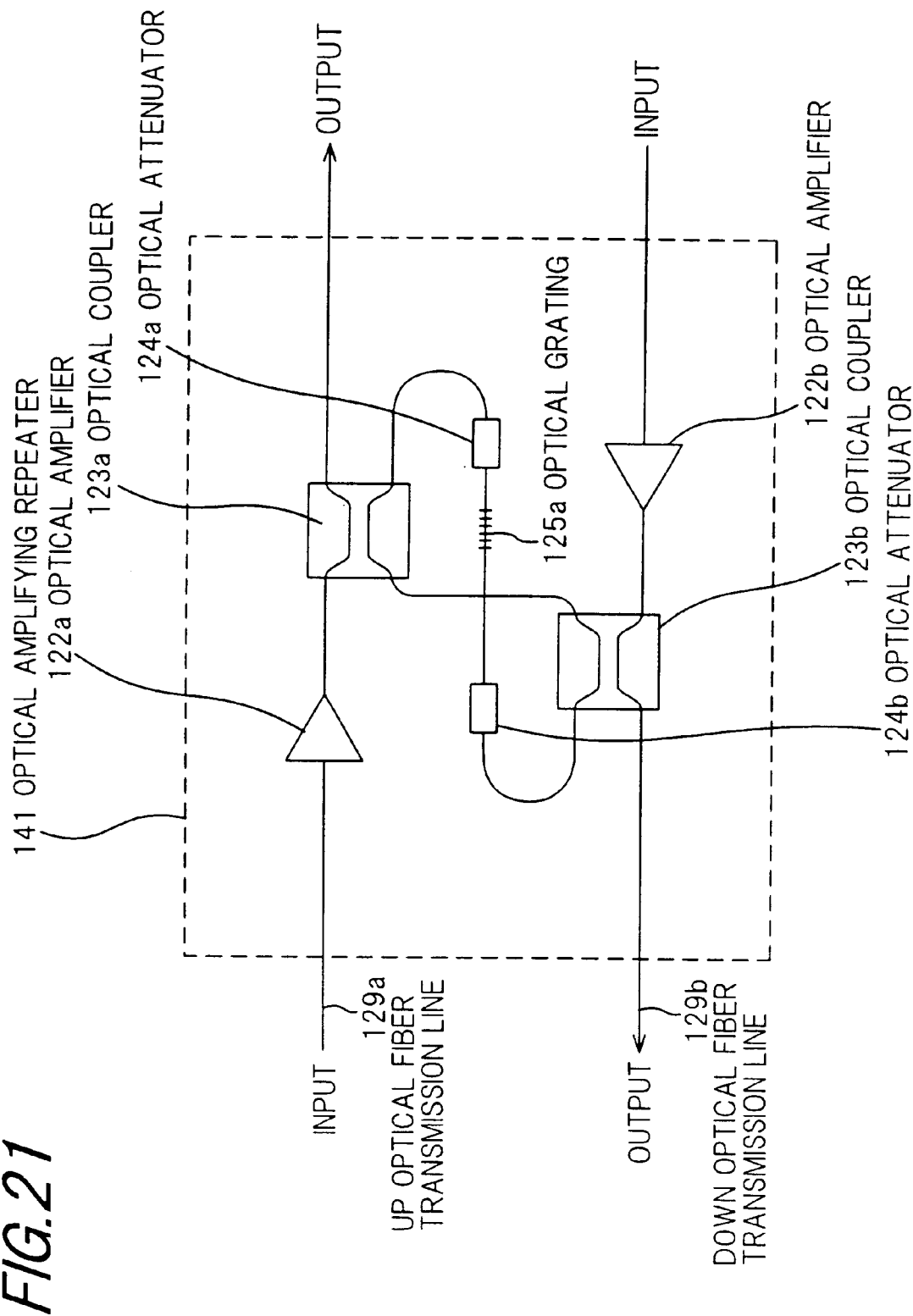
FIG. 21 is a connection diagram showing an optical amplifying repeater in a sixth preferred embodiment according to the invention.

FIG. 21 shows an optical amplifying repeater, which is capable of being monitored through supervisory signal light from an end-office system, in the sixth preferred embodiment according to the invention. In FIG. 21. like parts are indicated by like reference numerals as used in FIG. 17 and explanations thereto are omitted.

An optical amplifying repeater 141 in this embodiment is different from the optical amplifying repeater 121 in FIG. 17 in that the optical attenuators 124a, 124b are connected each other through only one optical grating 125a.

With this composition, both of up and down supervisory signal lights can be reflected by using the single optical grating 125a in common. Therefore, the number of components can be reduced and the cost of the system can be reduced. advantages of the Invention:

As explained above, in the supervisory signal light bypass circuit of the invention, by dividing optical signal by an optical coupler, reflecting only the supervisory signal light by a light reflecting means and coupling it to the opposite line, the supervisory signal light can be transferred without affecting main signal light to propagate through the optical fiber transmission line.

Also, in the optical amplifying repeater of the invention, since the supervisory signal light bypass circuit is provided for each of the up and down optical fiber transmission line and the supervisory signal light bypass circuit is composed of two up and down optical couplers, a light reflecting means provided for each output/input port and a bypass path between the optical couplers, the monitoring can be conducted without affecting main signal light to propagate through the optical fiber transmission line. Also, it is not necessary to widen the amplification wavelength band of optical amplifier since the main signal light does not deteriorate.

Furthermore, in the supervisory system of the invention, since the optical amplifying repeater with the supervisory signal light bypass circuit thus composed is provided on the optical fiber transmission line, the monitoring in the optical repeating transmission system can be conducted without affecting main signal light to propagate through the optical fiber transmission line.

Also, since an optical fiber grating as the light reflecting means can have a narrow reflection wavelength band, the supervisory signal light can be located close to the main signal light. Therefore, the amplification wavelength band of optical amplifier can be made relatively narrow.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. A supervisory signal light bypass circuit, comprising:
   a first 2×2 optical coupler provided on a first optical transmission line;
   a second 2×2 optical coupler provided on a second optical transmission line through which signal light flows in a direction opposite to said first optical transmission line;
   a third optical transmission line coupled to one output port of said first optical coupler and one output port of said second optical coupler;
   a first reflector that is provided at another output port of said first optical coupler and has a first reflection wavelength; and
   a second reflector that is provided at another output port of said second optical coupler and has a second reflection wavelength different from said first reflection wavelength.

2. A supervisory signal light bypass circuit, according to claim 1, wherein:
   said third optical transmission line is coupled such that only signal light with a wavelength that coincides with one of said first reflection wavelength and said second reflection wavelength passes through said third optical transmission line.

3. A supervisory signal light bypass circuit, according to claim 1, wherein:
   said third optical transmission line is coupled such that only signal light with a wavelength that coincides with both said first and second reflection wavelengths passes through said third optical transmission line.

4. A supervisory signal light bypass circuit, according to claim 1, wherein:
said first and second reflectors each are an optical fiber grating.

5. An optical amplifying repeater, comprising:
a first supervisory signal light bypass circuit that comprises,
a first 2×2 optical coupler provided on a first optical transmission line,
a second 2×2 optical coupler provided on a second optical transmission line through which signal light flows in the direction opposite to said first optical transmission line,
a first reflector that is provided at one output port of said first optical coupler and has a first reflection wavelength and is provided with a non-reflective end, and
a second reflector that is provided at one output port of said second optical coupler and has a second reflection wavelength and is provided with a non-reflective end;
a second supervisory signal light bypass circuit that comprises,
a third 2×2 optical coupler provided on said first optical transmission line,
a fourth 2×2 optical coupler provided on said second optical transmission line,
a third reflector that is provided at one output port of said third optical coupler and has said first reflection wavelength and is provided with a non-reflective end, and
a fourth reflector that is provided at one output port of said fourth optical coupler and has said second reflection wavelength and is provided with a non-reflective end;
first and second optical amplifiers that are provided inserted into said first and second optical transmission lines, respectively, between said first supervisory signal light bypass circuit and said second supervisory signal light bypass circuit;
a first connector that couples one output port of said first optical coupler to one output port of one of said second optical coupler and said fourth optical coupler; and
a second connector that couples one output port of said third optical coupler to one output port of said fourth or second optical coupler.

6. An optical amplifying repeater, according to claim 5, wherein:
said first and second connectors and said first to fourth reflectors are provided with an optical attenuator.

7. A supervisory system for an optical repeating transmission system that comprises:
an optical end-office system to transmit/receive signal light,
a first optical transmission line coupled to said optical end-office system,
a second optical transmission line that signal light is transmitted in the direction opposite to said first optical transmission line, and
at least one optical amplifying repeater with a pair of optical amplifiers for amplifying signal light to transmit through said first and second optical transmission lines, said optical amplifying repeater being disposed on said first and second optical transmission lines, wherein,
said optical end-office system comprises,
an optical sender to output main signal light, an optical receiver to receive signal light from said second optical transmission line,
a transmission line supervising circuit to transmit/receive supervisory signal light,
an optical multiplexer that multiplexes and sends said main signal light and said supervisory signal light to said first optical transmission line, and
an optical demultiplexer that demultiplexes said main signal light and supervisory signal light received from said second optical transmission line;
said optical amplifying repeater comprises a supervisory signal light bypass circuit to bypass part of said supervisory signal light from said first optical transmission line to said second optical transmission line; and
said transmission line supervising circuit of said optical end-office system receives said supervisory signal light sent back from said second optical transmission line through said supervisory signal light bypass circuit of said optical amplifying repeater, and monitors said first and second optical transmission lines based on the information of intensity amplitude, phase, frequency or time difference between said supervisory signal light transmitted from said optical end-office system and said supervisory signal light received , wherein interference between at least two of a main signal light of the first optical transmission line, a main signal light of the second optical transmission line and said supervisory signal light are substantially eliminated.

8. A supervisory system, according to claim 7, wherein:
said supervisory signal light bypass circuit of said optical amplifying repeater bypasses part of back scattered light generated when said supervisory signal light propagates through at least one of the first and second optical transmission lines.

9. A supervisory system, according to claim 7, wherein:
said supervisory signal light bypass circuit comprises:
a first 2×2 optical coupler provided on said first optical transmission line;
a second 2×2 optical coupler provided on said second optical transmission line;
a third optical transmission line coupled to one output port of said first optical coupler and one output port of said second optical coupler;
a first reflector that is provided at another output port of said first optical coupler and has a first reflection wavelength; and
a second reflector that is provided at another output port of said second optical coupler and has a second reflection wavelength.

10. A supervisory system, according to claim 9, wherein:
said third optical transmission line is provided with an optical attenuator.

11. A supervisory system, according to claim 7, wherein:
said supervisory signal light bypass circuit comprises:
a first supervisory signal light bypass circuit that comprises,
a first 2×2 optical coupler provided on a first optical transmission line,
a second 2×2 optical coupler provided on a second optical transmission line through which signal light flows in a direction opposite to said first optical transmission line, a first reflector that is provided at one output port of said first optical coupler and has a first reflection wavelength and is provided with a non-reflective end, and a second reflector that is provided at one output port of said second optical coupler and has a second reflection wavelength and is provided with a non-reflective end;

a second supervisory signal light bypass circuit that comprises, a third 2×2 optical coupler provided on said first optical transmission line, a fourth 2×2 optical coupler provided on said second optical transmission line, a third reflector that is provided at one output port of said third optical coupler and has said first reflection wavelength and is provided with a non-reflective end, and a fourth reflector that is provided at one output port of said fourth optical coupler and has said second reflection wavelength and is provided with a non-reflective end;

first and second optical amplifiers that are inserted into said first and second optical transmission lines, respectively, between said first supervisory signal light bypass circuit and said second supervisory signal light bypass circuit;

a first connector that connects one output port of said first optical coupler to one output port of said fourth optical coupler; and a second connector that connects one output port of said third optical coupler to one output port of said second optical coupler.

12. A supervisory system, according to claim 10, wherein:
said first and second connectors and said first to fourth reflectors are provided with an optical attenuator.

13. An optical amplifying repeater for receiving supervisory signal light transmitted through a first transmission line from an end-office system and sending back the supervisory signal light through an opposite second transmission line, comprising:

an amplifier that amplifies main signal light and supervisory signal light transmitted through said first transmission line from said end-office system;

a divider that divides part of said main signal light and supervisory signal light amplified by said amplifier;

an attenuator that attenuates said main signal light and supervisory signal light divided by said divider;

a transmitter/diffuser that transmits/diffuses only said main signal light attenuated by said attenuator and reflects only said supervisory signal light without substantially deteriorating said main signal light and said supervisory signal light; and a coupler that couples said supervisory signal light reflected by said transmitter/diffuser to said second transmission line opposite to said first transmission line and sends back said supervisory signal light to said end-office system.

14. An optical amplifying repeater, according to claim 13, wherein:
said transmitter/diffuser comprises multiple diffractors with different reflection wavelength bands that are coupled in series.

15. An optical amplifying repeater, according to claim 13, wherein:
said divider and said coupler each comprises a 2×2 optical coupler, said 2×2 optical couplers being coupled to each other by one input/output port to which said attenuator and said transmitter/diffuser are coupled.

16. An optical amplifying repeater for receiving supervisory signal light transmitted through a first transmission line from an end-office system and sending back the supervisory signal light through a second transmission line opposite to said first transmission line, comprising:

first and second amplifiers that amplify main signal light and supervisory signal light transmitted through said first and second transmission lines from said end-office system;

first and second divider/couplers that divide/couple signal light, said first and second divider/couplers positioned at said first and second transmission lines;

first and second signal light lines coupled between said first and second divider/couplers; and a transmitter and reflector that transmits said main signal light and reflects said supervisory signal light, said transmitter and reflector being provided on said first signal light line, wherein interference between at least two of main signal light of the first optical transmission line, main signal light of the second optical transmission line and said supervisory signal light are substantially eliminated.

17. A supervisory method for transmitting supervisory signal light from an end-office system through a first transmission line to an optical amplifying repeater and for monitoring said optical amplifying repeater based on the supervisory signal light sent back to said end-office system through a second transmission line opposite to said first transmission line, comprising the steps of:

multiplexing supervisory signal light modulated by any one of optical intensity modulation, optical frequency modulation and optical phase modulation with main signal light transmitted to said first transmission line;

transmitting said supervisory signal light and main signal light multiplexed to said optical amplifying repeater through said first transmission line;

extracting only said supervisory signal light by said optical amplifying repeater and multiplexing said supervisory signal light with main signal light propagating through said second transmission line without substantially deteriorating said main signal light and said supervisory signal light;

demultiplexing said supervisory signal light and main signal light transmitted through said second transmission line; and monitoring said optical amplifying repeater based on the information of intensity amplitude, phase, frequency or time difference of said supervisory signal light, wherein said supervisory signal light has been divided.

18. An optical amplifying repeater, comprising:

at least one bypass circuit that receives a first type of signal and a second type of signal from a first terminal on a first transmission line, and transmits said first type of signal back to said first terminal through a second transmission line, wherein interference between a signal light of said first transmission line and a signal light of said second transmission line is substantially eliminated;

an amplifier coupled to said bypass circuit and receiving said second type of signal; and an output terminal that receives said second type of signal, wherein a strength of said first type of signal transmitted back to said first terminal can be controlled by said bypassing circuit.

19. The optical amplifying repeater of claim 18, said at least one bypass circuit comprising:
- a first coupler that receives and outputs said first type of signal to an absorber and a transmitter in accordance with a wavelength of said first type of signal;
- a second coupler that is coupled to said first coupler at said transmitter, receives said first type of signal from said first coupler, and outputs said first type of signal back to said first terminal on said second transmission line and in accordance with said wavelength of said first type of signal.

20. The optical amplifying repeater of claim 19, further comprising:
- a first attenuator coupled in series between said first coupler and said absorber;
- a second attenuator coupled in series between said first coupler and said transmitter; and
- a third attenuator coupled in series between said second coupler and a second absorber, wherein said first, second and third attenuators are used to vary said strength of light transmitted back to said first terminal.

21. The optical amplifying repeater of claim 19, wherein said absorber is one of an optical grating and an optical waveguide type.

22. The optical amplifying repeater of claim 18, wherein said first transmission line and said second transmission line operate in opposite directions.

23. The optical amplifying repeater of claim 18, wherein said first terminal comprises an end-office system, said first type of signal comprises at least one supervisory light signal, and said second type of signal comprises a main light signal.

24. A supervisory system for an optical repeating transmission system, comprising:
- a first end office system and a second end office system;
- a plurality of optical amplifying repeaters coupled in series between said first end office system and said second end office system on a first transmission line having a first direction and a second transmission line having a second direction; and
- a first transmission line supervising circuit and second transmission line supervising circuit respectively coupled to said first transmission line and said second transmission line, wherein only a supervisory light signal is reflected to said first end office system and a main light signal is transmitted to the second end office system without substantially deteriorating said main light signal and said supervisory light signal, and an amount of said supervisory light can be varied by at least one of said plurality of optical amplifying repeaters.

25. The supervisory system of claim 24, each of said plurality of optical amplifying repeaters comprising:
- an amplifier that receives an input signal from one of said first end office system and said second end office system; and
- a bypass circuit that comprises a first optical coupler that receives a supervisory signal and a main signal from said first end office system, and outputs said main signal to said second end office system and said supervisory signal to a second optical coupler that transmits only said supervisory signal to said first end office system, without substantially altering said main signal.

26. The supervisory system of claim 24, each of said first end office system and said second end office system comprising:
- a transmitter that receives and processes input data comprising a plurality of input signal lines to generate said supervisory signal and said main signal on a single output line; and
- a receiver that receives said supervisory signal and said main signal from a bypass circuit on separate data lines.

27. The supervisory system of claim 26, said transmitter further comprising:
- a plurality of optical senders coupled to said corresponding plurality of input data lines; and
- an optical coupler coupled between said plurality of optical senders and said bypass circuit.

28. The supervisory system of claim 27, wherein a plurality of said main signals comprising lights of different wavelengths can be transmitted on each of said plurality of said data input signals.

29. The supervisory system of claim 26, said transmitter comprising:
- an optical coupler that receives said supervisory signal and said main signal in a single data input line; and
- a plurality of bandpass filters that receive outputs from said optical coupler; and
- a plurality of optical receivers that receive outputs from the plurality of bandpass filters to generate a plurality of outputs at a corresponding plurality of output data lines.

30. The supervisory system of claim 26, wherein a plurality of said main signals comprising lights of different wavelengths can be transmitted on each of said plurality of said data output lines.

* * * * *